US012742518B2

(12) United States Patent
Kadooka et al.

(10) Patent No.: US 12,742,518 B2
(45) Date of Patent: Sep. 22, 2026

(54) HYDROGEN STORAGE TANK FOR HYDROGEN AIRCRAFT

(71) Applicant: KAWASAKI JUKOGYO KABUSHIKI KAISHA, Kobe (JP)

(72) Inventors: Keisuke Kadooka, Kobe (JP); Koshiro Maki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 19/037,612

(22) Filed: Jan. 27, 2025

(65) Prior Publication Data

US 2025/0172248 A1 May 29, 2025

Related U.S. Application Data

(63) Continuation of application No. PCT/JP2023/026722, filed on Jul. 21, 2023.

(Continued)

(51) Int. Cl.
*F17C 3/04* (2006.01)
*B64D 37/06* (2006.01)

(52) U.S. Cl.
CPC ................ *F17C 3/04* (2013.01); *B64D 37/06* (2013.01); *F17C 2201/0109* (2013.01);

(Continued)

(58) Field of Classification Search
CPC ...... F17C 3/04; F17C 3/02; F17C 2201/0109; F17C 2201/0104; F17C 2221/012;

(Continued)

(56) References Cited

U.S. PATENT DOCUMENTS 2,863,297 A 12/1958 Johnston
3,021,027 A * 2/1962 Claxton ................ B65D 88/06 220/901

(Continued)

FOREIGN PATENT DOCUMENTS

DE 19882495 T1 7/2000
DE 102008054090 A1 5/2010

(Continued)

OTHER PUBLICATIONS

International Search Report and Written Opinion mailed on Oct. 3, 2023, received for PCT Application No. PCT/JP2023/026722, filed on Jul. 21, 2023, 9 pages including English Translation.

*Primary Examiner* — Robert J Hicks
(74) *Attorney, Agent, or Firm* — XSENSUS LLP

(57) ABSTRACT

A hydrogen storage tank for a hydrogen aircraft includes an outer tank, an inner tank, a first strap, and a second strap. The inner tank is disposed inside the outer tank with a space therebetween, and has a shape having a longitudinal direction. The first strap includes a first end connected to an inner surface of the outer tank and a second end connected to an outer surface of the inner tank. The second strap includes a third end connected to the inner surface of the outer tank and a fourth end connected to the outer surface of the inner tank. The first strap and the second strap extend along the longitudinal direction of the inner tank, and in the longitudinal direction, a distance between the second end and the fourth end is shorter than a distance between the first end and the third end.

20 Claims, 13 Drawing Sheets

Related U.S. Application Data

(60) Provisional application No. 63/392,593, filed on Jul. 27, 2022.

(52) U.S. Cl.
CPC ................ *F17C 2203/0304* (2013.01); *F17C 2203/0629* (2013.01); *F17C 2205/0107* (2013.01); *F17C 2221/012* (2013.01); *F17C 2223/0161* (2013.01); *F17C 2270/0189* (2013.01)

(58) Field of Classification Search
CPC ........ F17C 2260/011; F17C 2270/0189; F17C 2203/0304; F17C 2203/03; F17C 2203/0626; F17C 2203/011; F17C 2203/0612; F17C 2205/0107; F17C 2205/0103; B65D 90/028; B65D 81/3818; B65D 81/3869; B64D 37/06; B64D 37/02; B64D 37/005; Y10S 220/918
USPC .. 220/560.1, 560.07, 592, 586, 582, 592.27, 220/592.2
See application file for complete search history.

(56) References Cited

U.S. PATENT DOCUMENTS

| | | | | |
|---|---|---|---|---|
| 3,069,042 | A * | 12/1962 | Johnston | F17C 3/08 220/88.1 |
| 4,184,609 | A * | 1/1980 | Vorreiter | F17C 13/088 220/901 |
| 4,300,354 | A * | 11/1981 | Buchs | F17C 13/086 220/592.27 |
| 6,047,747 | A | 4/2000 | Bowen et al. | |
| 6,742,554 | B1 * | 6/2004 | Immel | F17C 1/00 220/560.07 |
| 2014/0117163 | A1 | 5/2014 | Simpson | |
| 2021/0164614 | A1 | 6/2021 | Fournel et al. | |
| 2022/0314787 | A1 * | 10/2022 | Rike | F17C 13/002 |

FOREIGN PATENT DOCUMENTS

| | | | |
|---|---|---|---|
| GB | 914193 | A | 12/1962 |
| JP | 2006-292031 | A | 10/2006 |
| JP | 2008-002543 | A | 1/2008 |
| JP | 2015-105683 | A | 6/2015 |
| JP | 2021-515151 | A | 6/2021 |

* cited by examiner

REAR
RIGHT
LEFT
FRONT
1
2
10
11
12
13
14
14
15
15

UP
DOWN
FRONT
REAR
2
3
4
VA
31
32
33
34
3A
4A
41
42
43
44
45
451
452
51(5)
511
512
52(5)
521
522

2
FRONT
REAR
UP
DOWN
521
52
522
512
51
511
FRONT-REAR LOAD
52
51
3
4
VA

HYDROGEN STORAGE TANK FOR HYDROGEN AIRCRAFT

CROSS-REFERENCE TO RELATED APPLICATIONS

The present application is a continuation of International Application No. PCT/JP2023/026722, filed Jul. 21, 2023, which claims priority to U.S. Provisional Application No. 63/392,593 filed Jul. 27, 2022, each are incorporated herein by reference.

FIELD OF INVENTION

The present disclosure relates to a hydrogen storage tank that is mounted on a hydrogen aircraft and stores hydrogen as fuel for the hydrogen aircraft.

BACKGROUND ART

A tank that stores liquefied gas such as liquid hydrogen includes an inner tank that stores the liquefied gas, and an outer tank that covers the inner tank via a heat insulating space. For example, liquefied gas storage tank that suspends and supports an inner tank with a belt-shaped support member connected to an inner surface of the outer tank is known.

A hydrogen aircraft that flies using liquid hydrogen as an energy source is known. In a hydrogen aircraft, it is necessary to mount a tank for storing liquid hydrogen on an airframe. A hydrogen storage tank mounted on a hydrogen aircraft is required to be reduced in weight. On the other hand, the hydrogen storage tank mounted on a hydrogen aircraft is preferred to withstand loads due to behaviors peculiar to the aircraft, such as inertia loads due to airframe motions and external loads such as vibrations. For this reason, it is difficult to directly apply an inner tank support structure of a hydrogen storage tank used on the ground to the hydrogen storage tank mounted on the hydrogen aircraft.

SUMMARY OF INVENTION

A hydrogen storage tank for a hydrogen aircraft according to an aspect of the present disclosure is a hydrogen storage tank that stores hydrogen as fuel for a hydrogen aircraft, the hydrogen storage tank including an outer tank, an inner tank disposed inside the outer tank with a space therebetween and having a shape having a longitudinal direction, a first strap including a first end and a second end opposite to the first end, the first end being connected to an inner surface of the outer tank and the second end being connected to an outer surface of the inner tank, and a second strap including a third end and a fourth end opposite to the third end, the third end being connected to the inner surface of the outer tank and the fourth end being connected to the outer surface of the inner tank, in which the first strap and the second strap extend along the longitudinal direction of the inner tank, and a distance between the second end and the fourth end is shorter than a distance between the first end and the third end in the longitudinal direction.

BRIEF DESCRIPTION OF THE DRAWINGS

FIG. 13 is a schematic view illustrating a split type outer tank which is a modification of the outer tank.

DETAILED DESCRIPTION

Hereinafter, embodiments of a hydrogen storage tank for a hydrogen aircraft according to the present disclosure will be described in detail with reference to the drawings. The hydrogen storage tank of the present disclosure is a tank that is mounted on a hydrogen aircraft that flies using hydrogen as an energy source and stores gaseous hydrogen or liquid hydrogen as fuel. The hydrogen aircraft may be either passenger or cargo. A propulsion system of a hydrogen aircraft is not limited as long as it uses hydrogen as an energy source. A propulsion system of a hydrogen aircraft may be, for example, a hydrogen combustion gas turbine engine, an electric propulsion device includes a combination of a fuel cell and an electric motor, or a hybrid propulsion device of the gas turbine engine and the electric propulsion device. Hereinafter, a specific embodiment of a hydrogen storage tank according to the present disclosure will be described.

[Outline of Hydrogen Aircraft]

Figure 1:
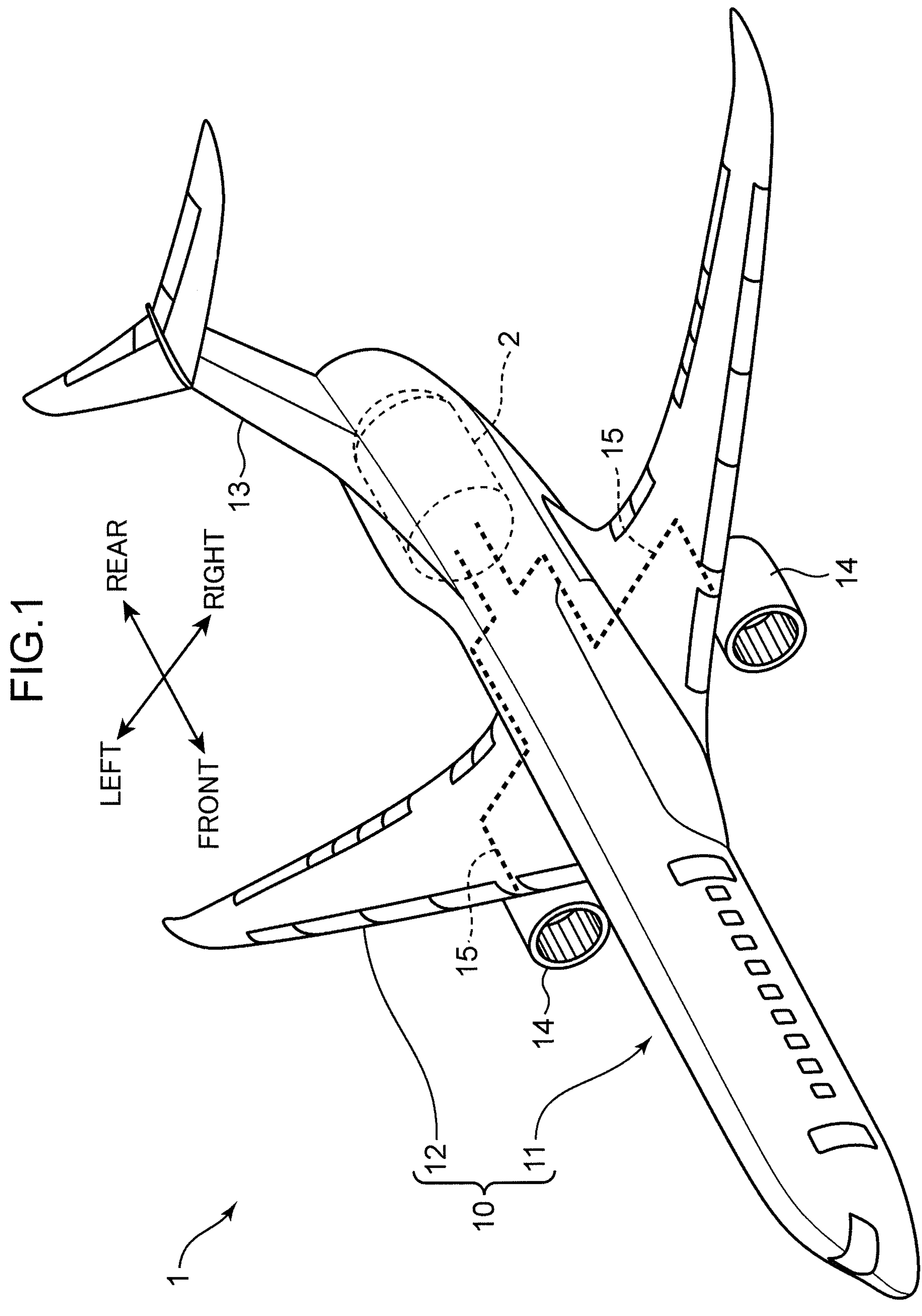
FIG. 1 is a perspective view of a hydrogen aircraft on which a hydrogen storage tank of the present disclosure is mounted.

FIG. 1 is a perspective view illustrating a hydrogen aircraft 1 including a hydrogen storage tank of the present disclosure. The hydrogen aircraft 1 includes an airframe 10, an engine 14, and a hydrogen storage tank 2 mounted near the rear of the airframe 10. Note that the mounting position of the hydrogen storage tank 2 is not limited to the rear of the airframe 10, and can be set at an appropriate position of the airframe 10.

The airframe 10 includes a fuselage 11, a pair of left and right main wings 12, and an empennage 13. The fuselage 11 includes structural materials such as a circular frame and a stringer, and a fuselage panel assembled in a cylindrical shape. The pair of main wings 12 includes spars and flaps. The pair of main wings 12 extend laterally from the fuselage 11. The empennage 13 is at the end of the fuselage 11 and includes a vertical empennage and a horizontal empennage. The engine 14 is, for example, a hydrogen combustion gas turbine engine that uses liquid hydrogen as fuel. The engine 14 is fixed to each of the pair of main wings 12. Note that, in the following description, a longitudinal direction of the fuselage 11 of the airframe 10 is referred to as a front-rear direction, and the side of one end of the fuselage 11 having the empennage 13 is defined as a rear side. Further, a direction in which the main wings 12 extend orthogonal to the front-rear direction is defined as a left-right direction. Furthermore, a direction orthogonal to the front-rear direction and the left-right direction is defined as an up-down direction of the airframe 10.

The hydrogen storage tank 2 is a tank that stores liquid hydrogen to be fuel for the engine 14, and is disposed in a housing section provided near a rear end of the fuselage 11. The hydrogen storage tank 2 has a cylindrical shape elongated in the front-rear direction of the airframe 10. The hydrogen storage tank 2 and the engine 14 are connected by a supply line 15. The liquid hydrogen stored in the hydrogen storage tank 2 is supplied to each of the engines 14 through a supply line 15.

In general, tanks that store cryogenic fluids, such as liquid hydrogen, require a high degree of heat insulation performance to maintain a cryogenic state. One method for ensuring such heat insulation performance is to form the tank with a vacuum double shell structure. The tank having a vacuum double shell structure is a tank including an outer tank and an inner tank disposed inside the outer tank with a space therebetween, in which a space between the inner tank and the outer tank is evacuated. The vacuum is a state of a space filled with a gas having a pressure lower than normal atmospheric pressure. As the hydrogen storage tank 2, it is desirable to use a tank having a vacuum double shell structure. However, conventional tanks having a vacuum double shell structure are designed to be installed on the ground and have poor consideration of weight limits generally suitable for aircraft. Further, in a tank for an aircraft, it is necessary to consider conditions unique to the aircraft, such as loads such as inertia load and vibration due to airframe motions, and changes in temperature and air pressure due to changes in flight altitude. Therefore, it is difficult to apply the vacuum double shell structure assuming ground installation to the hydrogen storage tank 2 of the hydrogen aircraft 1 as it is. Hereinafter, the hydrogen storage tank 2 according to the present embodiment suitable for fuel storage of the hydrogen aircraft 1 will be described in detail.

[Structure of Hydrogen Storage Tank]

Figure 2:
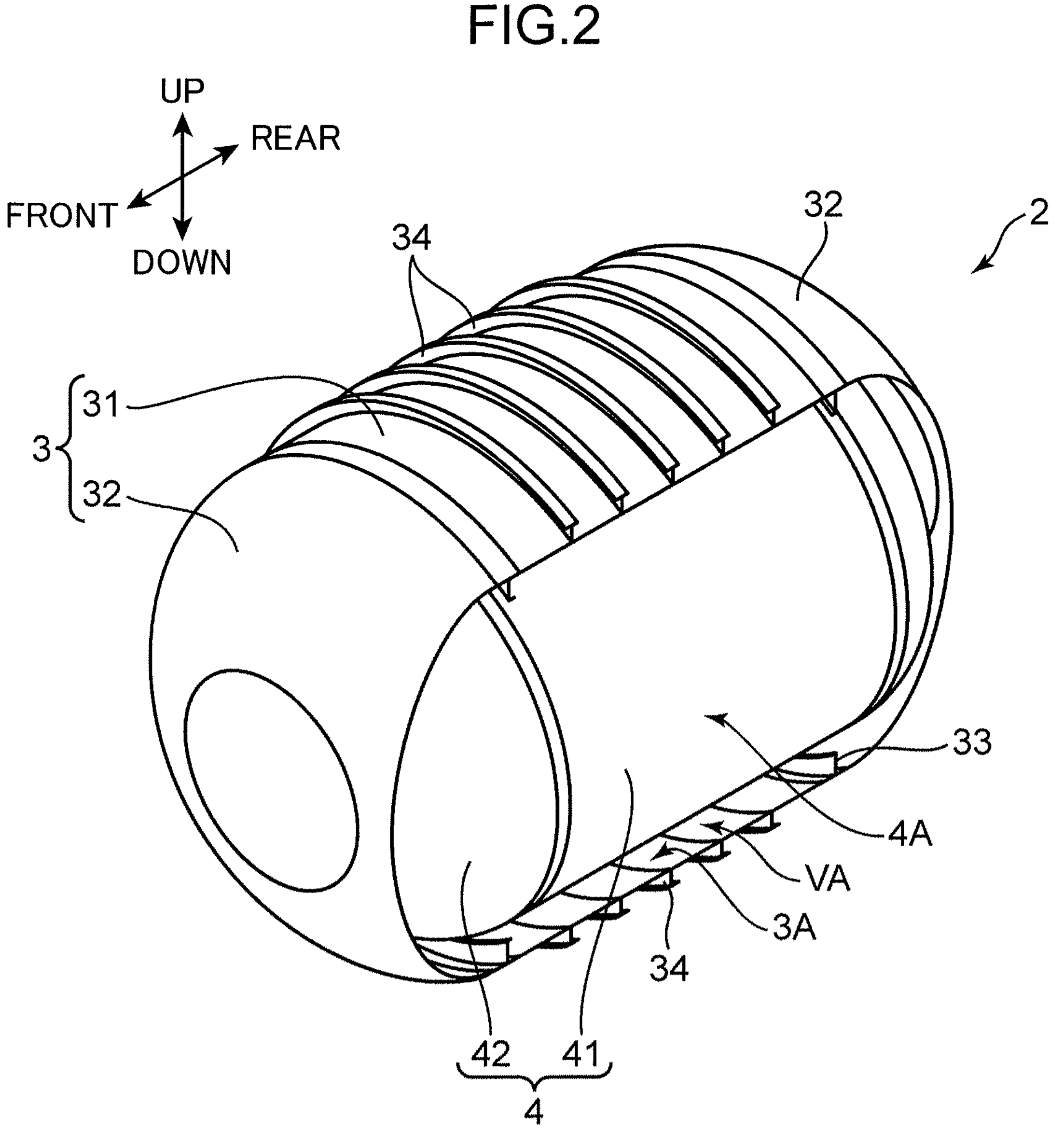
FIG. 2 is a partially broken perspective view of the hydrogen storage tank.
Figure 3:
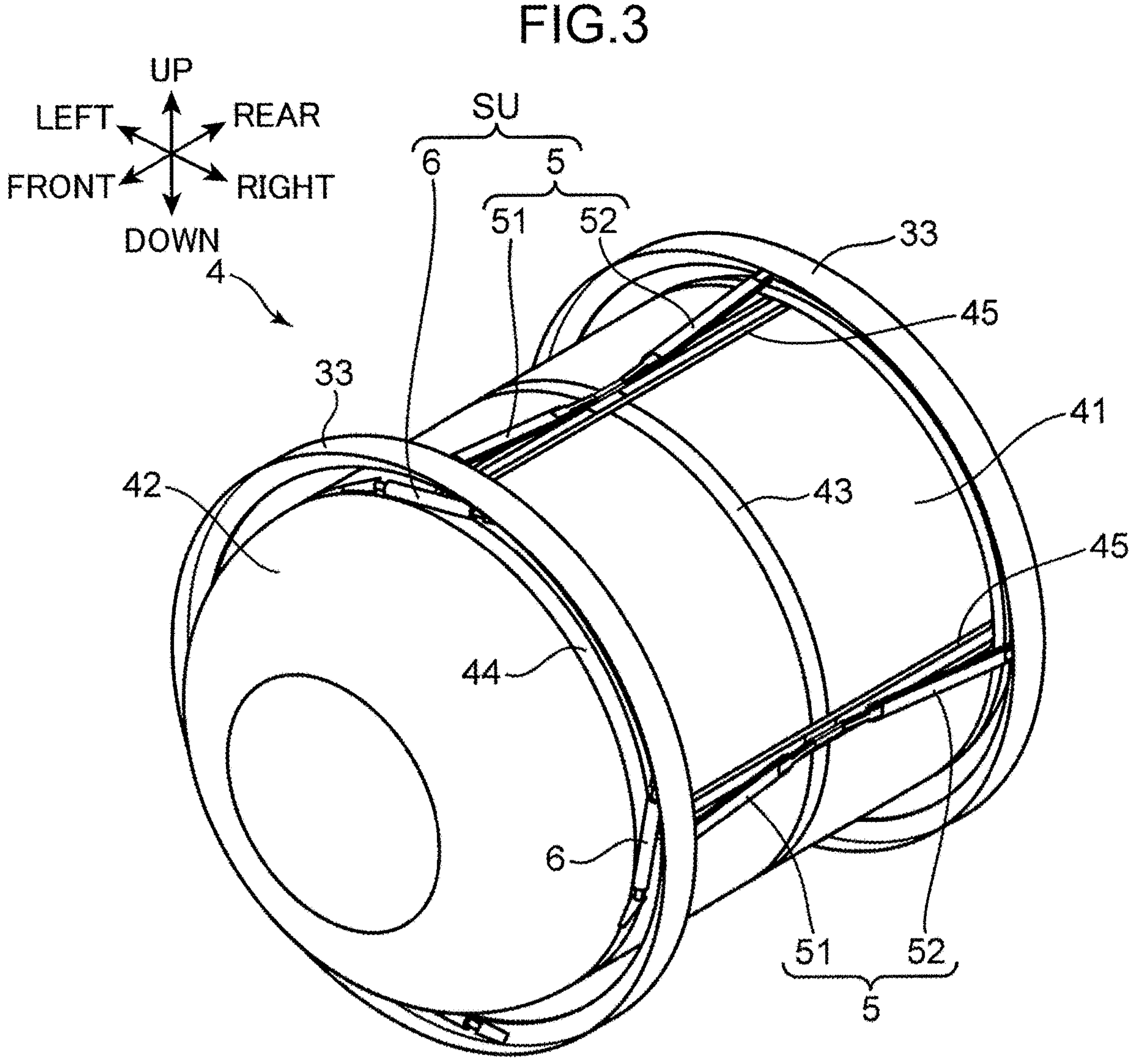
FIG. 3 is a perspective view illustrating an inner tank and a support structure of the inner tank.

FIG. 2 is a partially broken perspective view of the hydrogen storage tank 2. The hydrogen storage tank 2 is a tank having a vacuum double shell structure including an outer tank 3 and an inner tank 4 disposed inside the outer tank 3 with a space therebetween. The outer tank 3 is configured to generate a heat insulation effect. A space between an inner surface 3A of the outer tank 3 and an outer surface 4A of the inner tank 4 is a vacuum layer VA when the hydrogen storage tank 2 is in operation. Since the space between the inner surface 3A of the outer tank 3 and the outer surface 4A of the inner tank 4 becomes the vacuum layer VA, a heat insulating effect is generated between the outer tank 3 and the inner tank 4. The inner tank 4 is configured to store liquid hydrogen therein. FIG. 3 is a perspective view illustrating the inner tank 4 and a support structure SU of the inner tank 4. Note that, for simplification of illustration, the support structure SU is omitted in FIG. 2. The outer tank 3 and the inner tank 4 are cylindrical in which both ends are closed. The outer tank 3 and the inner tank 4 have a longitudinal direction in an axial direction of the cylinder. The hydrogen storage tank 2 is installed on the airframe 10 such that the longitudinal direction is along the front-rear direction of the airframe 10. Hereinafter, a description will be given on the assumption that the longitudinal direction of the hydrogen storage tank 2 substantially coincides with the front-rear direction of the airframe 10.

The outer tank 3 includes an outer tank cylinder 31 and a pair of front and rear outer tank lids 32. The outer tank cylinder 31 and the outer tank lid 32 are formed by a metal plate material. The outer tank cylinder 31 has a cylindrical shape and constitutes a center portion in the front-rear direction of the outer tank 3. The pair of outer tank lids 32 closes respective openings at one end and the other end of the cylindrical outer tank cylinder 31, which are a front end and a rear end in the present embodiment. In the present embodiment, one end and the other end of the outer tank cylinder 31 are the front end and the rear end of the outer tank cylinder 31. The outer tank lid 32 has a dome shape bulging forward or backward. The outer tank lid 32 is provided with a pipe for supplying liquid hydrogen to the inner tank 4, a pipe for connecting with the supply line 15, a hatch for inspection, and the like.

The outer tank cylinder 31 is provided with an internal reinforcing frame 33 and an external reinforcing frame 34 which are loop-shaped frames. The internal reinforcing frame 33 and the external reinforcing frame 34 are structures for reinforcing the outer tank cylinder 31. The internal reinforcing frame 33 is disposed at a position corresponding to each of the front end and the rear end of the outer tank cylinder 31. The internal reinforcing frame 33 is connected to the inner surface 3A of the outer tank cylinder 31 and protrudes from the inner surface 3A to a radially inside of the outer tank cylinder 31. The internal reinforcing frame 33 has a loop shape extending over the entire inner circumference of the outer tank cylinder 31. The external reinforcing frame 34 is connected to the outer surface of the outer tank cylinder 31 and protrudes radially outward of the outer tank cylinder 31 from the outer surface. The external reinforcing frame 34 has a loop shape extending over the entire outer circumference of the outer tank cylinder 31. The external reinforcing frame 34 is disposed between the pair of front and rear internal reinforcing frames 33 on the outer surface of the outer tank cylinder 31. In the present embodiment, an example is illustrated in which five external reinforcing frames 34 having a T-shaped cross section are arranged at equal intervals in the longitudinal direction of the outer tank cylinder 31.

The inner tank 4 includes an inner tank cylinder 41 and a pair of front and rear inner tank lids 42. The inner tank cylinder 41 and the inner tank lid 42 are formed by a metal plate material. The inner tank cylinder 41 constitutes a center portion in the front-rear direction of the inner tank 4. The inner tank cylinder 41 has a cylindrical shape and has a tubular side peripheral surface along the longitudinal direction of the inner tank 4. The pair of inner tank lids 42 closes respective openings at the front end and the rear end of the cylindrical inner tank cylinder 41. The inner tank lid 42 has a dome shape bulging forward or backward. In the present embodiment, an example is illustrated in which an axial length and an inner diameter of the outer tank cylinder 31, and an axial length and an inner diameter of the inner tank cylinder 41 are substantially equal. This is an example, and the shapes of the outer tank 3 and the inner tank 4 may be appropriately changed as long as the front-rear direction is the longitudinal direction.

The inner tank cylinder 41 is provided with a center frame 43 and a pair of end frames 44 extending in a circumferential direction, and stringers 45 extending in the longitudinal direction of the inner tank 4. The center frame 43, the end frames 44, and the stringers 45 are structures for reinforcing the inner tank cylinder 41. The center frame 43 is a loop-shaped frame disposed near the center of the inner tank cylinder 41 in the front-rear direction. The end frames 44 are loop-shaped frames disposed at respective positions corresponding to the front end and the rear end of the inner tank cylinder 41. The stringers 45 are disposed at intervals of 90 degrees in the circumferential direction of the inner tank cylinder 41 and are connected to the outer surface 4A. The stringers 45 each include a portion protruding radially outward from the outer surface 4A by a predetermined height. The arrangement interval of the stringers 45 is not limited to 90 degrees, and may be appropriately set according to the strength design.

The support structure SU of the inner tank 4 includes a strap 5 and a rod 6. The strap 5 connects the inner tank 4 and the outer tank 3, and transfers a load in the front-rear direction between the inner tank 4 and the outer tank 3. Generally, in an aircraft, an inertial load in the front-rear direction is relatively large. Therefore, it is assumed that the strap 5 transfers a relatively large load. In the present embodiment, the strap 5 is attached to an arrangement position of each stringer 45. The strap 5 may be attached independently of the arrangement position of the stringer 45. The strap 5 includes a first strap 51 and a second strap 52. The first strap 51 is disposed on a front side of the center frame 43. The second strap 52 is disposed on a rear side of the center frame 43.

The rod 6 transfers loads in the up-down direction and the left-right direction of the inner tank 4 to the outer tank 3. In the present embodiment, an example in which the rod 6 is disposed at four locations on the outer periphery of the inner tank cylinder 41 is illustrated, but the arrangement mode of the rod 6 is not limited as long as loads in the up-down direction and the left-right direction can be transferred. Hereinafter, details of the support structure SU will be described with reference to FIGS. 4 to 6.

[Support Structure of Inner Tank]

Figure 4:
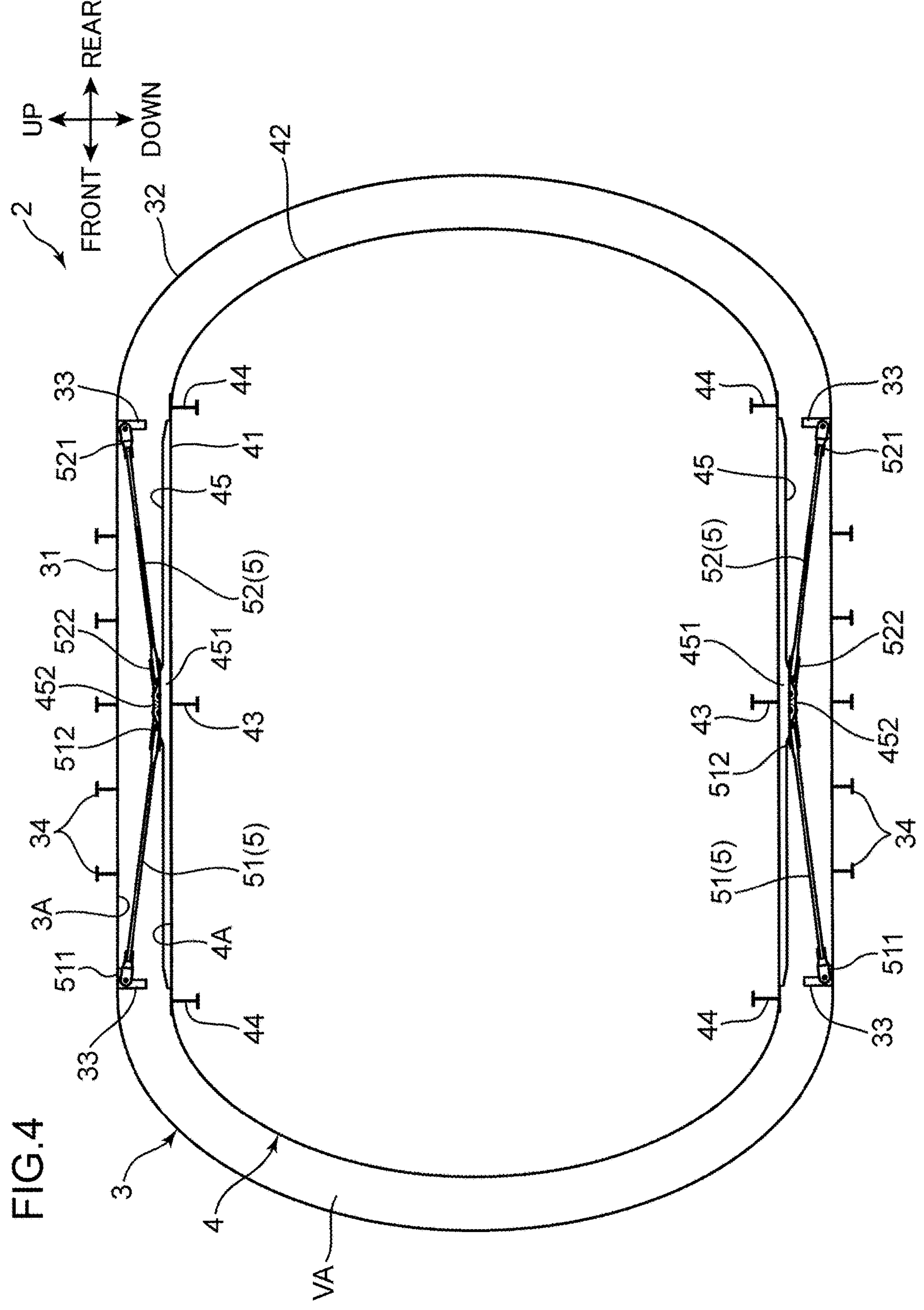
FIG. 4 is a cross-sectional view taken along a front-rear direction (longitudinal direction) of the hydrogen storage tank.

FIG. 4 is a cross-sectional view taken along the front-rear direction of the hydrogen storage tank 2. In FIG. 4, the straps 5 arranged at the upper end and the lower end of the inner tank cylinder 41 are illustrated. In the present embodiment, the straps 5 are also arranged at a left end and a right end of the inner tank cylinder 41 in a direction perpendicular to the plane of drawing of FIG. 4. The first strap 51 and the second strap 52 extend along the longitudinal direction of the inner tank 4 in the vacuum layer VA between the outer tank 3 and the inner tank 4. The longitudinal direction of the inner tank 4 coincides with the front-rear direction of the airframe 10. Strictly speaking, the first strap 51 and the second strap 52 extend with a slight inclination with respect to the longitudinal direction, but in the present specification, even a state with a slight inclination is regarded as "along the longitudinal direction".

The first strap 51 includes a main body portion, a first end 511, and a second end 512. The main body portion is made of a thin strip. The first end 511 is attached to one end of the main body portion. The second end 512 is attached to the other end of the main body portion opposite to the one end to which the first end 511 is attached. The main body portion of the first strap 51 can be formed by metal, resin, fiber-reinforced resin, or the like having a predetermined strength. For example, the main body portion may be constituted by stainless steel, a titanium alloy, or glass fiber reinforced plastic (GFRP). Note that the main body portion may have any shape as long as the main body portion has a cross-section of a constant shape. For example, the cross-sectional shape of the main body portion may be circular, elliptical, square, or polygonal. Further, in order to adjust the length of the main body portion, a turnbuckle may be provided between the main body portion and the first end 511 or the second end 512.

In the present embodiment, the first strap 51, the second strap 52, and their ends are arranged in one plane. The first strap 51 and the second strap 52 transfer an in-plane tensile load. On the other hand, the first strap 51 and the second strap 52 bend when subjected to an in-plane compressive load, and thus do not transfer an in-plane compressive load. Thus, when a rearward load is applied to the inner tank 4, the first strap 51 transfers the load to the outer tank 3 as a tensile load. On the other hand, the second strap 52 bends, and thus does not perform load transmission. Conversely, when a forward load is applied to the inner tank 4, the second strap 52 performs load transmission and the first strap 51 does not perform load transmission. GFRP is a material having low thermal conductivity and low density. In addition, GFRP is stronger against a tensile load than a compressive load. By using a strip plate made of GFRP as the main body portion of the first strap 51 and the second strap 52, the weight of the support structure SU can be reduced, and heat applied into the inner tank 4 through the first strap 51 and the second strap 52 can be suppressed.

The first end 511 on the front end side of the first strap 51 is connected to the inner surface 3A of the outer tank 3. On the other hand, the second end 512 on a rear end side of the first strap 51 is connected to the outer surface 4A of the inner tank 4. Specifically, the first end 511 is connected to an internal reinforcing frame 33 disposed at the front end of the outer tank cylinder 31 and protruding radially inward from the inner surface 3A. The second end 512 is connected to the stringer 45 attached to the outer surface 4A. The connection position between the second end 512 and the stringer 45 in the front-rear direction of the inner tank 4 is a position where the center frame 43 is disposed in the inner tank cylinder 41.

The second strap 52 includes a main body portion similar to the first strap 51, a third end 521 attached to one end of the main body portion, and a fourth end 522 attached to the other end. The third end 521 on the rear end side of the second strap 52 is connected to the inner surface 3A of the outer tank 3. On the other hand, the fourth end 522 on the front end side of the second strap 52 is connected to the outer surface 4A of the inner tank 4. Specifically, the third end 521 is connected to the internal reinforcing frame 33 disposed at the rear end of the outer tank cylinder 31. The fourth end 522 is connected to the stringer 45 attached to the outer surface 4A. The connection position between the fourth end 522 and the stringer 45 in the front-rear direction of the inner tank 4 is a position where the center frame 43 is disposed in the inner tank cylinder 41.

In the first strap 51 and the second strap 52, the first end 511 and the third end 521 connected to the outer tank 3 are separated to an extent substantially corresponding to the front-back width of the outer tank cylinder 31. On the other hand, in the first strap 51 and the second strap 52, the second end 512 and the fourth end 522 connected to the inner tank 4 are in a positional relationship of being adjacent to each other in the front-rear direction. As a result, the first strap 51 and the second strap 52 are disposed in the vacuum layer VA in a posture having a V-shape with an inner angle being obtuse in a cross-sectional view of the hydrogen storage tank 2 in the front-rear direction. Further, the body portions of the first strap 51 and the second strap 52, and the first end 511, the second end 512, the third end 521, and the fourth end 522 are arranged in one cross section illustrated in FIG. 4.

Both the first end 511 and the third end 521 are connected to an internal reinforcing frame 33 which is a reinforcing member in the circumferential direction of the outer tank 3. Further, the second end 512 and the fourth end 522 are connected to the stringer 45 which is a reinforcing member in the longitudinal direction of the inner tank 4. That is, the first strap 51 and the second strap 52 transfers a load to the reinforcing member rather than the wall surface members of the outer tank 3 and the inner tank 4. Therefore, the inner tank 4 can be stably supported through the first strap 51 and the second strap 52. Further, it is possible to reduce the wall thickness of the wall surface member and reduce the weight thereof.

Note that, of the internal reinforcing frame 33 and the external reinforcing frame 34 that reinforce the outer tank 3, only a radial frame piece of the internal reinforcing frame 33 to which the first end 511 and the third end 521 are connected protrudes to the vacuum layer VA. Further, among the center frame 43, the end frame 44, and the stringer 45 that reinforce the inner tank 4, only the stringer 45 to which the second end 512 and the fourth end 522 are connected protrudes to the vacuum layer VA. In this manner, only the minimum necessary members for attaching the first end 511, the second end 512, the third end 521, and the fourth end 522 protrude to the vacuum layer VA. By this measure, outgas that can be released from the reinforcing material is suppressed, and a decrease in the degree of vacuum of the vacuum layer VA is suppressed. By reducing the surface area of the wall surface defining the vacuum layer VA as much as possible, the amount of outgas released from the wall surface can be suppressed.

Figure 5A:
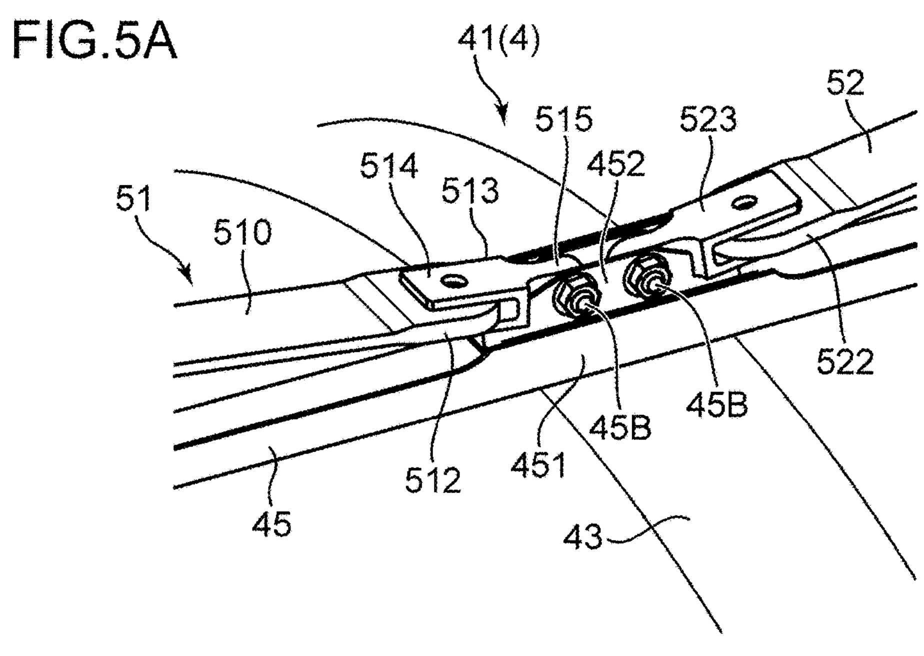
FIG. 5A is a perspective view illustrating an attachment portion of strap ends to the inner tank.
Figure 5B:
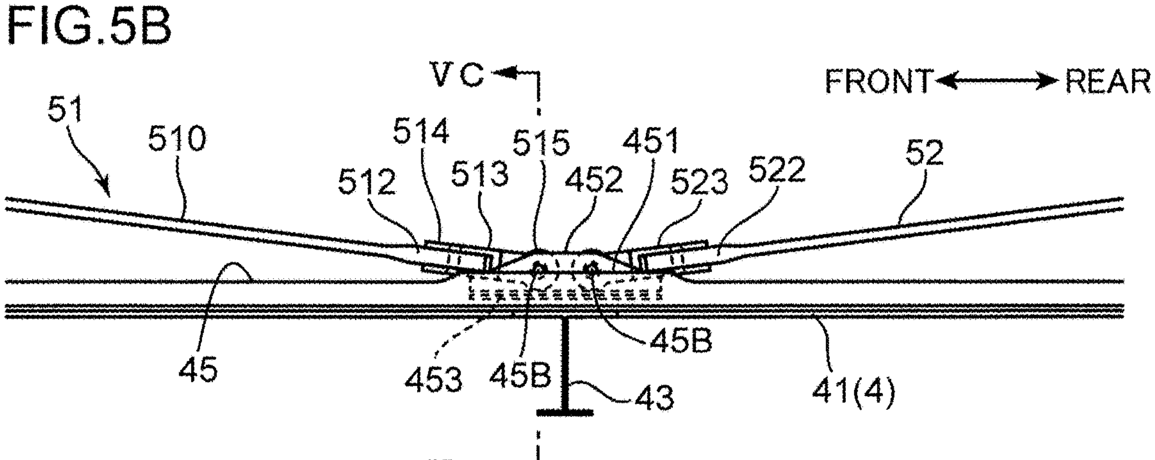
FIG. 5B is a side view illustrating an attachment portion of the strap ends to the inner tank.
Figure 5C:
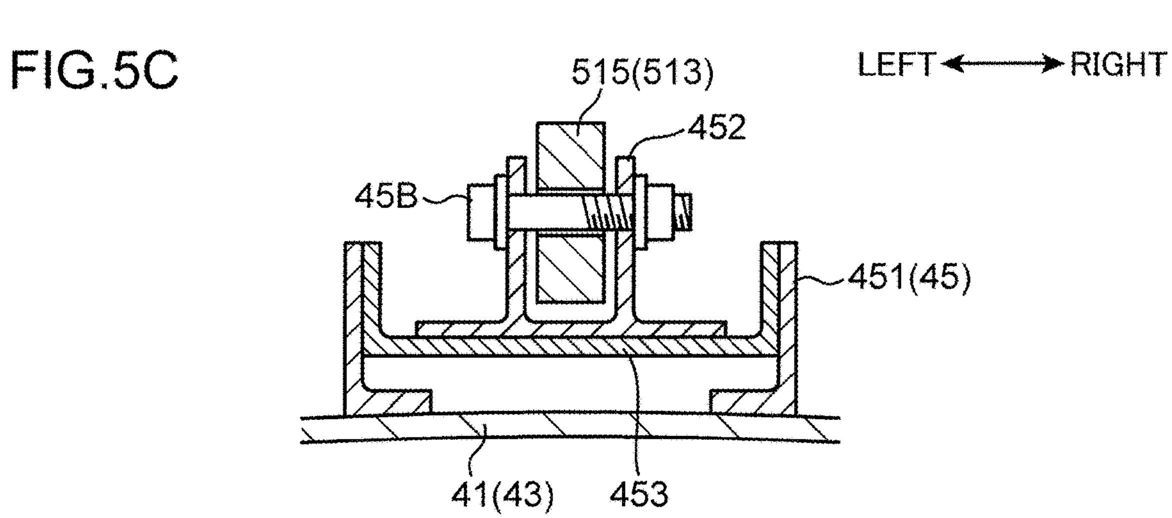
FIG. 5C is a cross-sectional view taken along line VC-VC in FIG. 5B.

With reference to FIGS. 5A to 5C, the attachment structure of the second end 512 and the fourth end 522 of the first strap 51 and the second strap 52 to the inner tank 4 will be described in detail. FIG. 5A is a perspective view illustrating an attachment portion of strap ends to the inner tank 4, FIG. 5B is a side view thereof, and FIG. 5C is a cross-sectional view taken along line VC-VC of FIG. 5B. A first holder 513 is attached to the second end 512 of the first strap 51. A second holder 523 is attached to the fourth end 522 of the second strap 52. Since the first holder 513 and the second holder 523 are the same members, the first holder 513 will be described here.

The second end 512 is thicker than the main body portion 510 of the first strap 51. The first holder 513 includes a clamping portion 514 and a pivoting portion 515. The clamping portion 514 clamps and holds the second end 512. The pivoting portion 515 is pivotally coupled to the stringer 45. The stringer 45 has a seat 451 protruding radially outward from the other portions at a center position in the front-rear direction. The position of the seat 451 is also the position where the stringer 45 intersects the center frame 43. The seat 451 protrudes radially outward from the other portion of the stringer 45. As illustrated in FIG. 5C, the stringer 45 includes a pair of left and right L-shaped frames.

A U-shaped support bracket 453 is held between the pair of L-shaped frames. A mounting bracket 452 is attached to a circumferentially outside of the inner tank 4 in the support bracket 453. The mounting bracket 452 includes an upright piece. The upright piece sandwiches the pivoting portion 515 of the first holder 513. A bolt hole is formed in the upright piece. A bolt hole is also formed in the pivoting portion 515. A bolt 45B passes through the bolt holes of the mounting bracket 452 and the pivoting portion 515 and is fastened. By attaching the first holder 513 to the seat 451 of the stringer 45 in this mode, the first strap 51 can pivot about the axis of the bolt 45B.

The second holder 523 is also attached to the seat 451 via the bolt 45B. Therefore, the second strap 52 can also pivot about the axis of the bolt 45B. The first end 511 and the third end 521 are also pivotally connected to the internal reinforcing frame 33 of the outer tank 3 via members similar to the first holder 513 and the bolt 45B. As described above, the first end 511 and the third end 521 are pivotally connected to the inner surface 3A of the outer tank 3, and the second end 512 and the fourth end 522 are pivotally connected to the outer surface 4A of the inner tank 4. As a result, the first strap 51 and the second strap 52 do not transfer a bending load. Therefore, it is possible to prevent a load that is not expected in design from being applied to the first strap 51 and the second strap 52 due to relative deformation between the inner tank 4 and the outer tank 3.

Figure 6:
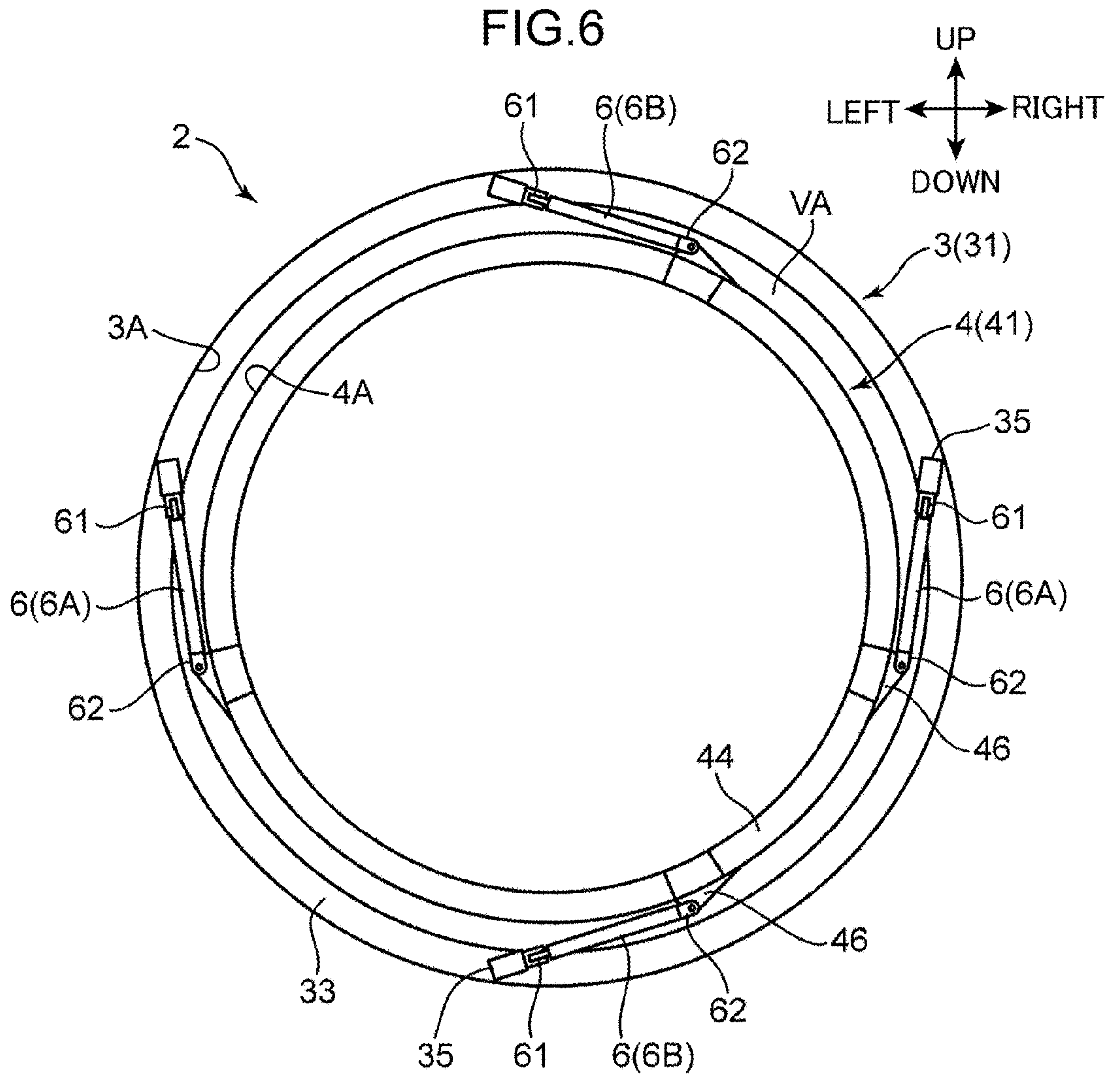
FIG. 6 is a cross-sectional view taken along a left-right direction of the hydrogen storage tank.

FIG. 6 is a cross-sectional view taken along the left-right direction of the hydrogen storage tank 2. Four rods 6 extend in the circumferential direction of the side peripheral surface of the inner tank 4. Each rod 6 connects the outer surface 4A, which is the side peripheral surface of the inner tank 4, and the inner surface 3A of the outer tank 3. Specifically, each rod 6 is disposed in the vacuum layer VA so as to extend in a tangential direction of the side peripheral surface of the inner tank cylinder 41 which is a cylindrical surface. Strictly speaking, since each rod 6 extends in the tangential direction, each rod 6 has a slight inclination with respect to the circumferential direction, but in the present specification, even such an extending mode is regarded as "extending in the circumferential direction".

The four rods 6 are arranged on the upper, lower, left, and right sides of the inner tank 4 at intervals of 90 degrees in the circumferential direction of the inner tank cylinder 41. Among the four rods 6, two rods 6 arranged on the left and right of the inner tank 4 are defined as vertical rods 6A. The vertical rod 6A transfers an up-down direction load between the inner tank 4 and the outer tank 3. On the other hand, the two rods 6 disposed above and below the inner tank 4 are defined as lateral rods 6B. The lateral rod 6B transfers a left-right direction load between the inner tank 4 and the outer tank 3.

The four rods 6 have the same configuration and are attached to the outer tank 3 and the inner tank 4 in the same manner. The rods 6 each include a rod main body, a fifth end 61 on one end side of the rod main body, and a sixth end 62 on the other end side of the rod main body. The rod main body is a hollow rod having a circular cross section. It is desirable that the rod main body is formed by a material having low density and low thermal conductivity such as GFRP from the viewpoint of weight reduction and suppression of heat applied to the inner tank 4. When importance is placed on factors other than weight reduction and heat applied, the rod main body may be formed by a metal material such as stainless steel as a solid body.

The fifth end 61 is connected to the outer tank 3 via a mounting bracket 35. The sixth end 62 is connected to the inner tank 4 via a bracket 46. The mounting bracket 35 is fixed to the internal reinforcing frame 33 protruding from the inner surface 3A of the outer tank 3. In the present embodiment, the fifth end 61 of the rod 6 and the first end 511 of the first strap 51 or the third end 521 of the second strap 52 are connected to the internal reinforcing frame 33. The bracket 46 protrudes from the outer surface 4A at the arrangement position of the end frame 44 in the inner tank cylinder 41.

The fifth end 61 is connected to the mounting bracket 35 by pin connection using a bolt. Similarly, the sixth end 62 is connected to the bracket 46 by pin connection using a bolt. The pin connecting the fifth end 61 is disposed in a direction along an upper, lower, left, and right cross section of the inner tank 4 illustrated in FIG. 6. On the other hand, the pin connecting the sixth end 62 is disposed in a direction along a front and rear cross section of the inner tank 4 illustrated in FIG. 4. That is, the extending direction of a pin shaft of the fifth end 61 serving as a pivot is orthogonal to the extending direction of a pin shaft of the sixth end 62. In this manner, the fifth end 61 of the rod 6 is pivotally connected to the inner surface 3A of the outer tank 3, and the sixth end 62 is pivotally connected to the outer surface 4A of the inner tank 4. As a result, the rod 6 does not subjected to a bending load and transfers only a tensile load or a compressive load. Therefore, it is possible to prevent a load that is not expected in design from being applied to the rod 6 due to relative deformation between the inner tank 4 and the outer tank 3.

[Behaviors of Support Structure of Inner Tank]

Figure 7A:
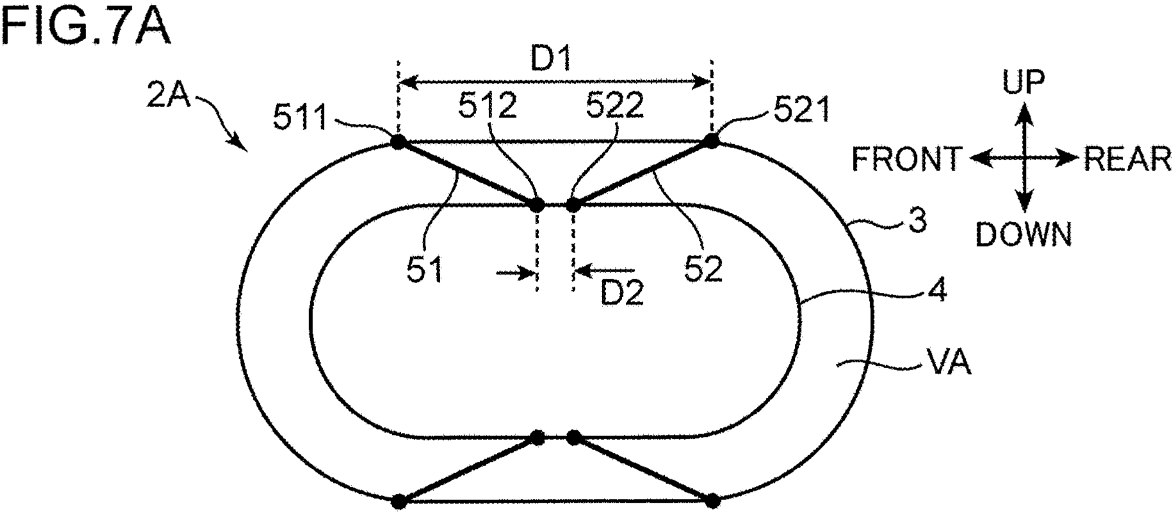
FIG. 7A is a schematic view illustrating a support mode of the inner tank by straps according to the present embodiment.

Behaviors of the support structure SU of the inner tank 4 during the operation of the hydrogen aircraft 1 will be described. FIG. 7A is a schematic view of a hydrogen storage tank 2A with a support mode of the inner tank 4 by the first strap 51 and the second strap 52 to which the idea of the present disclosure is applied. In the hydrogen storage tank 2A, the inner tank 4 is supported by the first strap 51 and the second strap 52. In the front-rear direction, which is the longitudinal direction of the inner tank 4, a distance between the first end 511 of the first strap 51 and the third end 521 of the second strap 52 connected to the outer tank 3 is defined as D1. Further, a distance between the second end 512 of the first strap 51 and the fourth end 522 of the second strap 52 connected to the inner tank 4 is defined as D2. In the present embodiment, D2 is set to be shorter than D1. That is, D1>D2 holds.

Figure 7B:
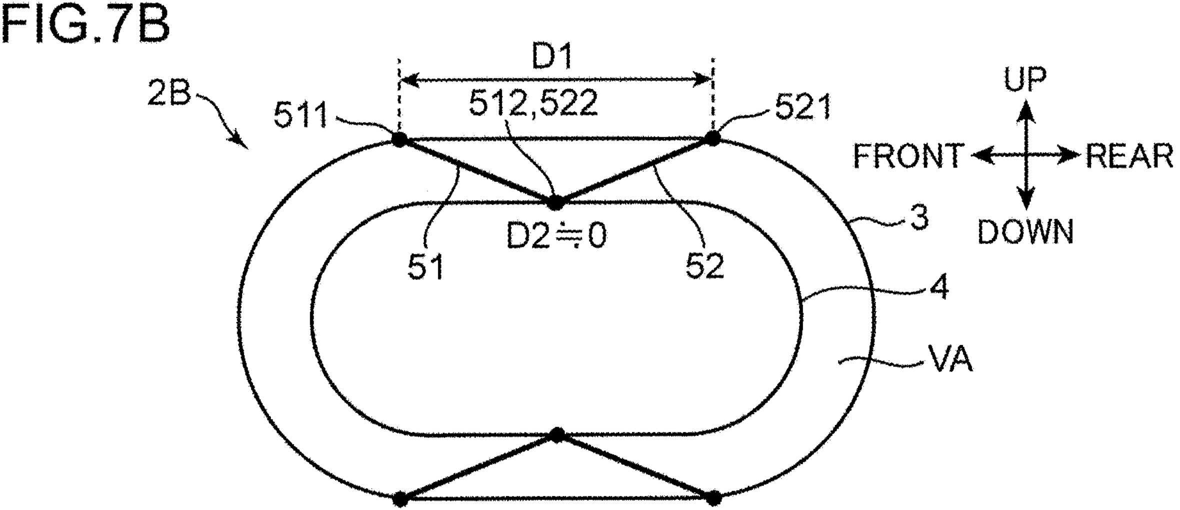
FIG. 7B is a schematic view illustrating another support mode of the inner tank by straps according to the present embodiment.

FIG. 7B is a schematic view of a hydrogen storage tank 2B having another support mode of the inner tank 4 by the first strap 51 and the second strap 52 according to the present embodiment. As illustrated in FIG. 4, the hydrogen storage tank 2B has a configuration in which the second end 512 and the fourth end 522 are adjacent to each other. That is, D2≈0 in this support mode.

Thermal expansion and thermal contraction may occur in the inner tank 4 due to a change in the storage amount of liquid hydrogen or the like. On the other hand, since the outer tank 3 is not in contact with liquid hydrogen, thermal expansion and thermal contraction of the outer tank 3 are smaller than those of the inner tank 4. Therefore, relative deformation may occur in which the size of the inner tank 4 greatly changes with respect to the outer tank 3. Further, the relative deformation may also occur due to pressure factors such as an external pressure of the hydrogen storage tank 2 and pressures of the inner tank 4 and the vacuum layer VA. Depending on the connection position of the first strap 51 and the second strap 52 with respect to the inner tank 4, the effect of expansion and contraction of the inner tank 4 may be added to the first strap 51 and the second strap 52.

Figure 7C:
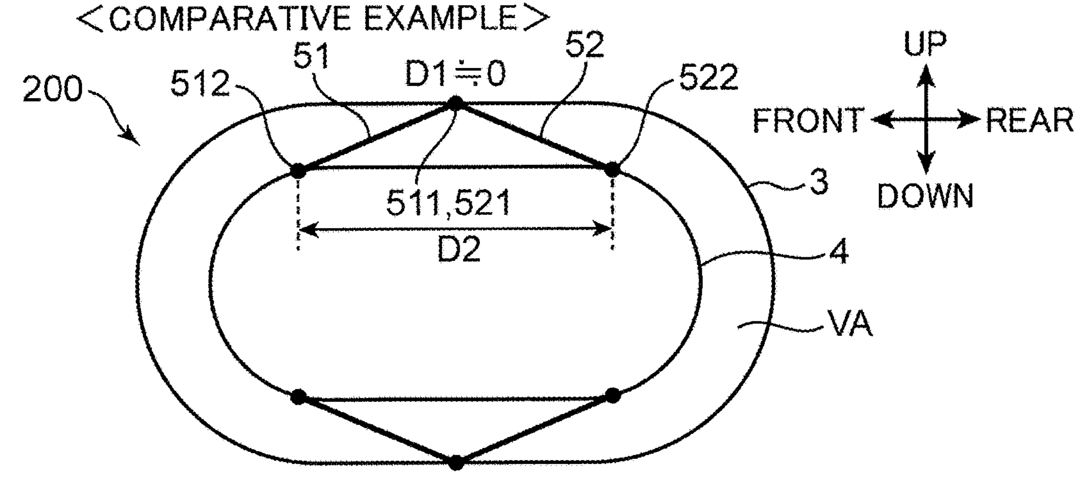
FIG. 7C is a schematic view illustrating a support mode of the inner tank by straps according to a comparative example.

FIG. 7C is a schematic view of a hydrogen storage tank 200 having a support mode of the inner tank by straps according to a comparative example. In the hydrogen storage tank 200, the distance D1≈0 between the first end 511 and the third end 521 connected to the outer tank 3. On the other hand, in the hydrogen storage tank 200, the distance D2 between the second end 512 and the fourth end 522 connected to the inner tank 4 has a considerable length in the longitudinal direction. In this case, the variation amount of D2 when the inner tank 4 expands and contracts increases. Therefore, an unexpected load is applied to the first strap 51 and the second strap 52, and damage such as buckling may occur in the first strap 51 and the second strap 52.

On the other hand, in the present embodiment, D1>D2 or D2≈0 is satisfied. That is, in the present embodiment, the second end 512 and the fourth end 522 are disposed at a relatively short distance. That is, the distance between two supporting points of the inner tank 4 is set shorter than that in the comparative example. Therefore, the variation amount of D2 when the inner tank 4 expands and contracts becomes small. Therefore, it is possible to suppress the influence of thermal expansion and contraction behaviors of the inner tank 4 on the support structure SU of the inner tank 4 including the first strap 51 and the second strap 52. In particular, in the support mode with D2≈0 illustrated in FIG. 7B, the influence of expansion and contraction on the inner tank 4 substantially does not reach the first strap 51 and the second strap 52. Note that, in the present embodiment, the case where the first strap 51 and the second strap 52 have the same length is exemplified, but the first strap 51 and the second strap 52 may have different lengths as long as the relationship of D1>D2 or D2≈0 is satisfied.

Figure 8:
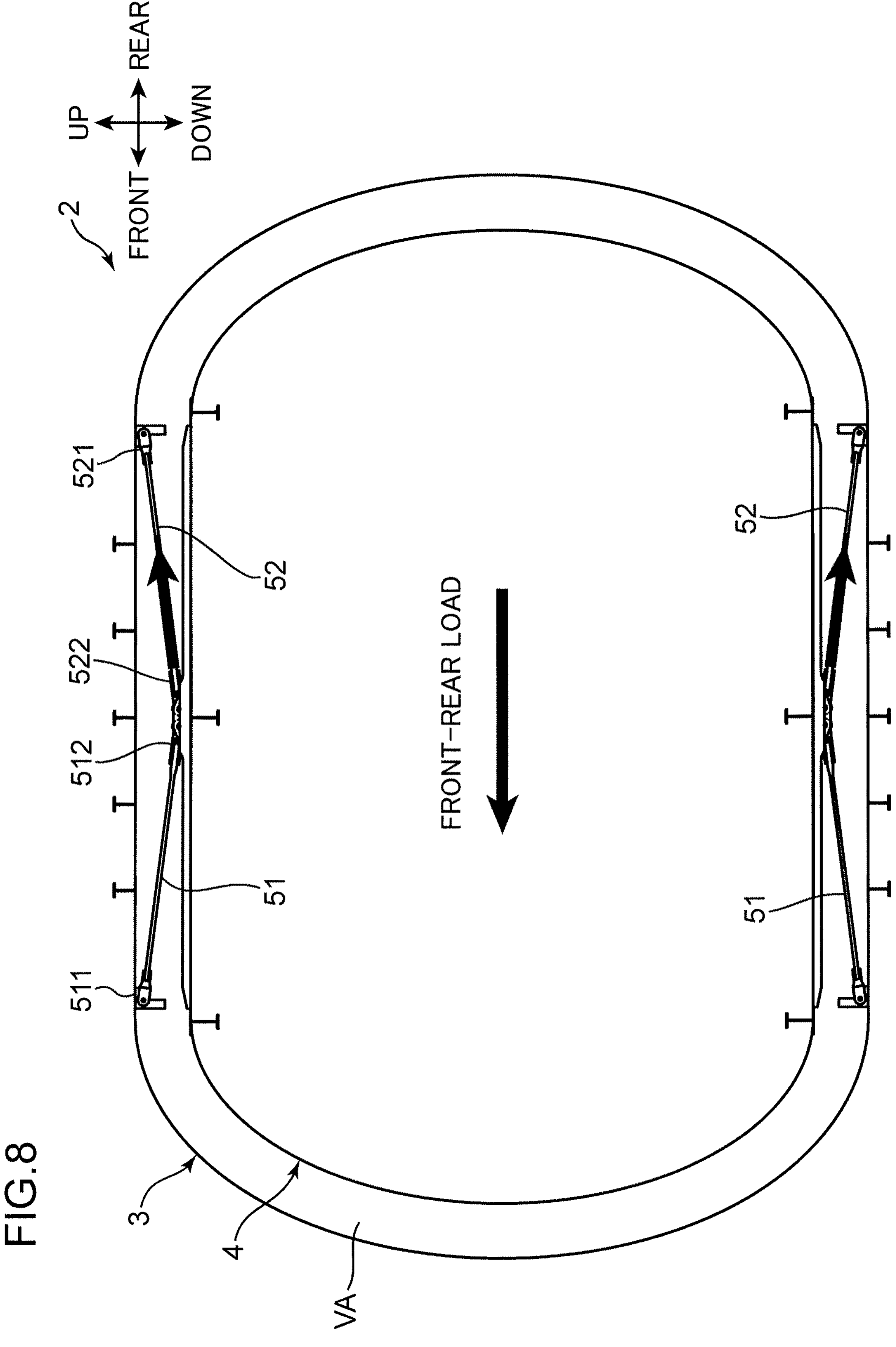
FIG. 8 is a cross-sectional view of the hydrogen storage tank in the front-rear direction, illustrating a load bearing state of the straps.

FIG. 8 is a cross-sectional view of the hydrogen storage tank 2 in the front-rear direction, illustrating a load bearing state of the first strap 51 and the second strap 52. The first strap 51 and the second strap 52 are arranged in an obtuse V-shaped posture with the center in the longitudinal direction of the inner tank 4 as a supporting point. Moreover, the main bodies of the first strap 51 and the second strap 52, and the first end 511, the second end 512, the third end 521, and the fourth end 522 are disposed in one plane.

When an inertia load that causes the inner tank 4 to move forward is generated as indicated by an arrow in FIG. 8, the second strap 52 positioned on the rear side transfers the load to the outer tank 3 as a tensile load. At this time, the first strap 51 on the front side is bent. On the other hand, when an inertia load that causes the inner tank 4 to move backward is generated, the first strap 51 positioned on the front side transfers the load to the outer tank 3 as a tensile load. At this time, the second strap 52 on the rear side is bent.

In this manner, the first strap 51 and the second strap 52 transfer the load of the inner tank 4 only by the in-plane tensile load. Thus, design consideration for buckling of the first strap 51 and the second strap 52 becomes unnecessary. Therefore, an elongated shape having a relatively small cross-sectional area can be selected as the first strap 51 and the second strap 52. In addition, as a material of the first strap 51 and the second strap 52, a strap having low density and low thermal conductivity such as GFRP can be employed instead of an expensive high-strength metal material. This also contributes to suppression of heat applied into the inner tank 4 through the first strap 51 and the second strap 52 and weight reduction of the support structure SU of the inner tank 4. Furthermore, since the first end 511, the second end 512, the third end 521, and the fourth end 522 are pivotally connected to the inner surface 3A of the outer tank 3 or the outer surface 4A of the inner tank 4, there is also an advantage that a bending load can be prevented from being applied to the first strap 51 and the second strap 52 due to relative deformation between the inner tank 4 and the outer tank 3.

Figure 9:
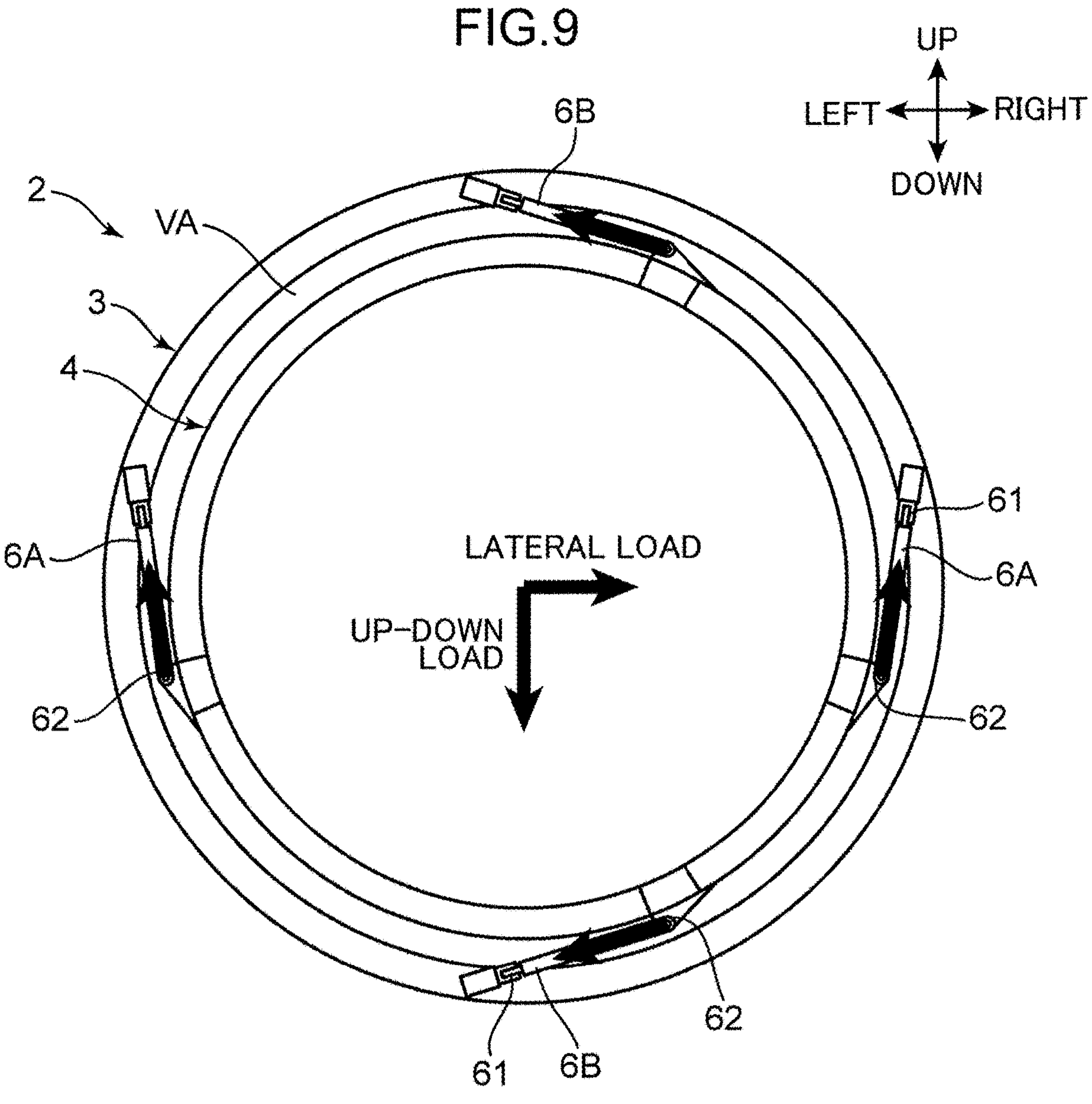
FIG. 9 is a cross-sectional view of the hydrogen storage tank in the left-right direction, illustrating a load bearing state of rods.

FIG. 9 is a cross-sectional view of the hydrogen storage tank 2 in the left-right direction, illustrating a load bearing state of the rod 6. Among the four rods 6, the pair of vertical rods 6A arranged on the left and right of the inner tank 4 transfers an up-down load applied to the inner tank 4 to the outer tank 3. The pair of lateral rods 6B disposed above and below the inner tank 4 transfers a left-right load applied to the inner tank 4 to the outer tank 3. In general, the up-down load and the left-right load applied to the inner tank 4 by inertia are smaller than the front-rear load borne by the first strap 51 and the second strap 52. Therefore, in the present embodiment, the vertical rods 6A and the lateral rods 6B are arranged so as to transfer a compressive load in addition to a tensile load.

When a downward load is applied to the inner tank 4 as indicated by an arrow in FIG. 9, the vertical rods 6A transfer a tensile load to the outer tank 3. Further, when a right direction load is applied to the inner tank 4, the lateral rods 6B transfer a tensile load to the outer tank 3. Conversely, when loads in the upward direction and the leftward direction are applied to the inner tank 4, the vertical rods 6A and the lateral rods 6B transfer respective compressive loads to the outer tank 3. In view of such a load bearing state, it is desirable to use a member having a circular cross section that is resistant to buckling for the vertical rods 6A and the lateral rods 6B. In particular, when a hollow rod of GFRP is used for the vertical rods 6A and the lateral rods 6B, it is possible to contribute to suppression of heat input to the inner tank 4 through the vertical rods 6A and the lateral rods 6B and weight reduction of the support structure SU of the inner tank 4.

The vertical rods 6A and the lateral rods 6B extend in the tangential direction of the side peripheral surface of the inner tank cylinder 41 which is a cylindrical surface. Therefore, the structure constituting the wall surface of the inner tank 4 can easily receive the load transferred from the vertical rods 6A and the lateral rods 6B as a load in an in-plane direction. That is, since a load is not applied to the inner tank 4 in a direction intersecting the extending direction of the wall surface, a load that recesses the wall surface is hardly applied to the inner tank 4. Further, since the fifth end 61 and the sixth end 62 of 6A and 6B are pivotable, it is possible to prevent a bending load from being applied to the vertical rods 6A and the lateral rods 6B due to relative deformation between the inner tank 4 and the outer tank 3.

[Modification of Strap Support Structure]

Figure 10A:
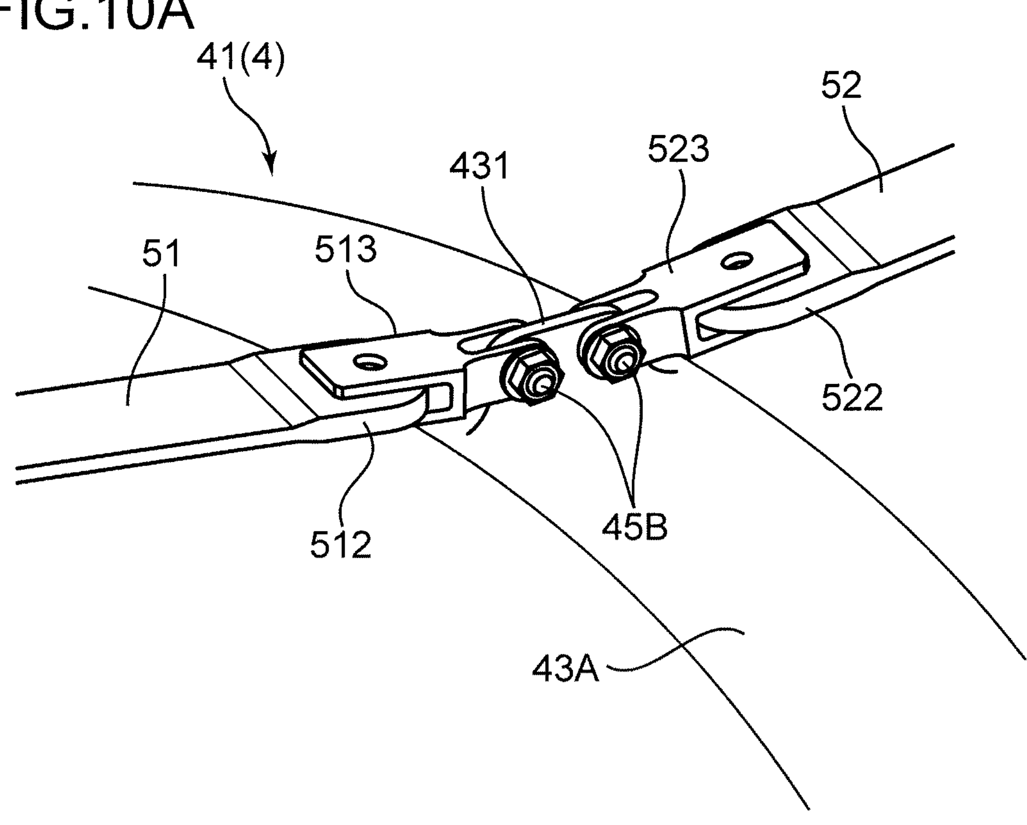
FIG. 10A is a perspective view illustrating a modification of the attachment portion of the strap ends to the inner tank.
Figure 10B:
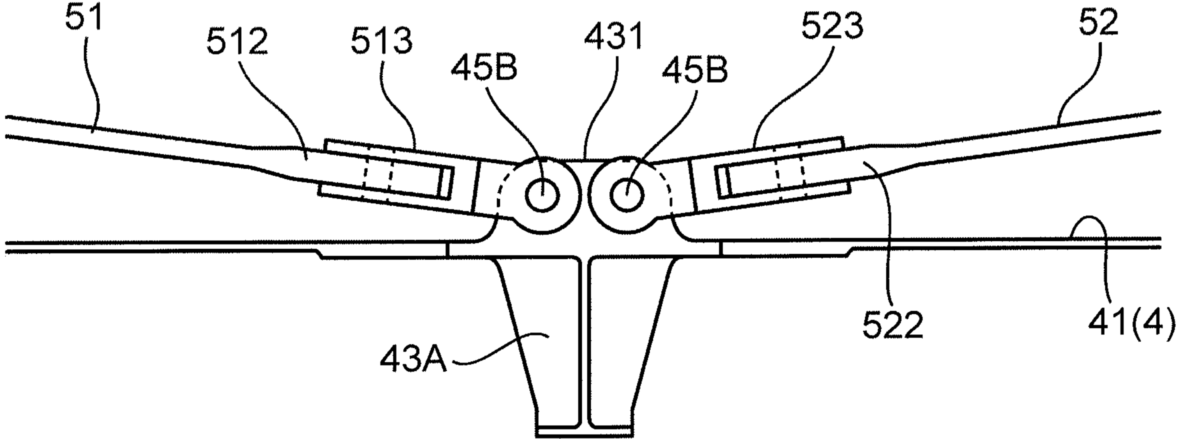
FIG. 10B is a side view of the attachment portion of FIG. 10A.

FIG. 10A is a perspective view illustrating a first modification of the attachment portion of the end of the strap 5 to the inner tank 4. FIG. 10B is a side view of the attachment portion of FIG. 10A. In the first modification, an example in which the connection destination of the second end 512 and the fourth end 522 is a center frame 43A of the inner tank cylinder 41 will be described.

The center frame 43A includes a protruding piece 431 projecting radially outward from the outer surface of the center frame 43A. The protruding piece 431 is a plate-like projection formed integrally with the center frame 43A. Two bolt holes are drilled in the protruding piece 431 in the circumferential direction of the inner tank 4. Bolts 45B are respectively inserted into the two bolt holes and the bolt holes of the first holder 513 of the second end 512 and the second holder 523 of the fourth end 522. The first strap 51 and the second strap 52 are pivotable about the axis of the bolt 45B pivotally supported by the protruding piece 431.

Figure 11A:
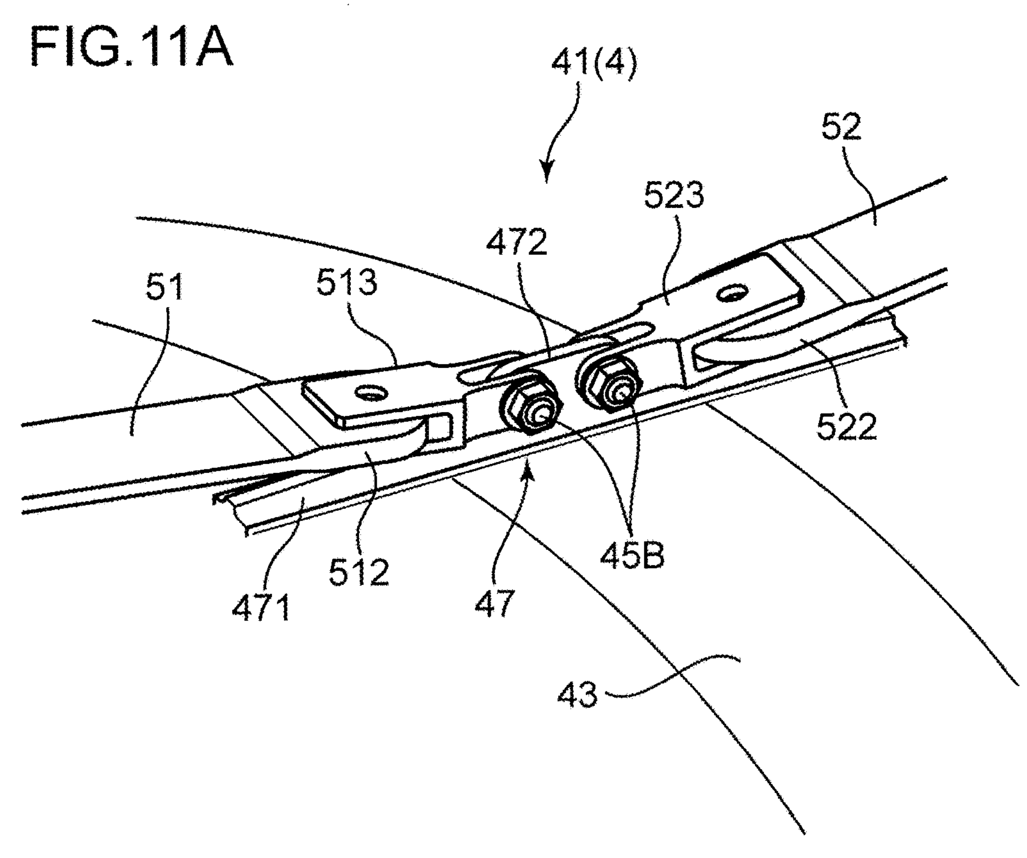
FIG. 11A is a perspective view illustrating a modification of the attachment portion of the strap ends to the inner tank.
Figure 11B:
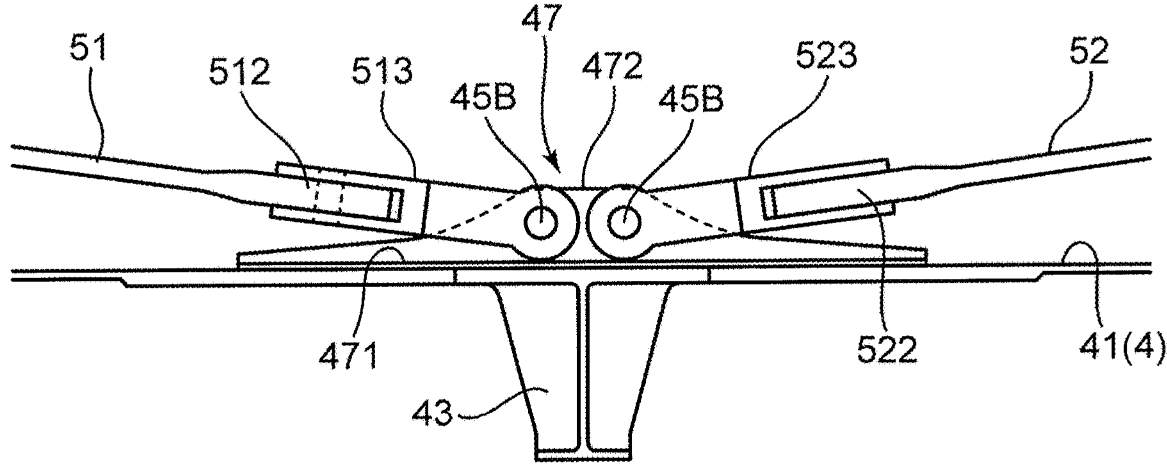
FIG. 11B is a side view of the attachment portion of FIG. 11A.

FIG. 11A is a perspective view illustrating a second modification of the attachment portion of the end of the strap 5 to the inner tank 4. FIG. 11B is a side view of the attachment portion of FIG. 11A. In the second modification, an example will be described in which a fitting 47, which is a member separate from the reinforcing member of the inner tank cylinder 41 such as the stringer 45 and the center frame 43A, is used as the connection destination of the second end 512 and the fourth end 522.

The fitting 47 includes a seat 471 and a support plate 472. The seat 471 is a plate elongated in the front-rear direction. The seat 471 is welded along the outer surface of the inner tank cylinder 41. The support plate 472 protrudes radially outward of the inner tank 4 from the seat 471. Two bolt holes are drilled in the support plate 472 in the circumferential direction of the inner tank 4. Bolts 45B are respectively inserted into the two bolt holes and the bolt holes of the first holder 513 of the second end 512 and the second holder 523 of the fourth end 522. The first strap 51 and the second strap 52 are pivotable about the axis of the bolt 45B pivotally supported by the support plate 472.

[Heat Insulating Structure Between Inner Tank and Outer Tank]

Figure 12:
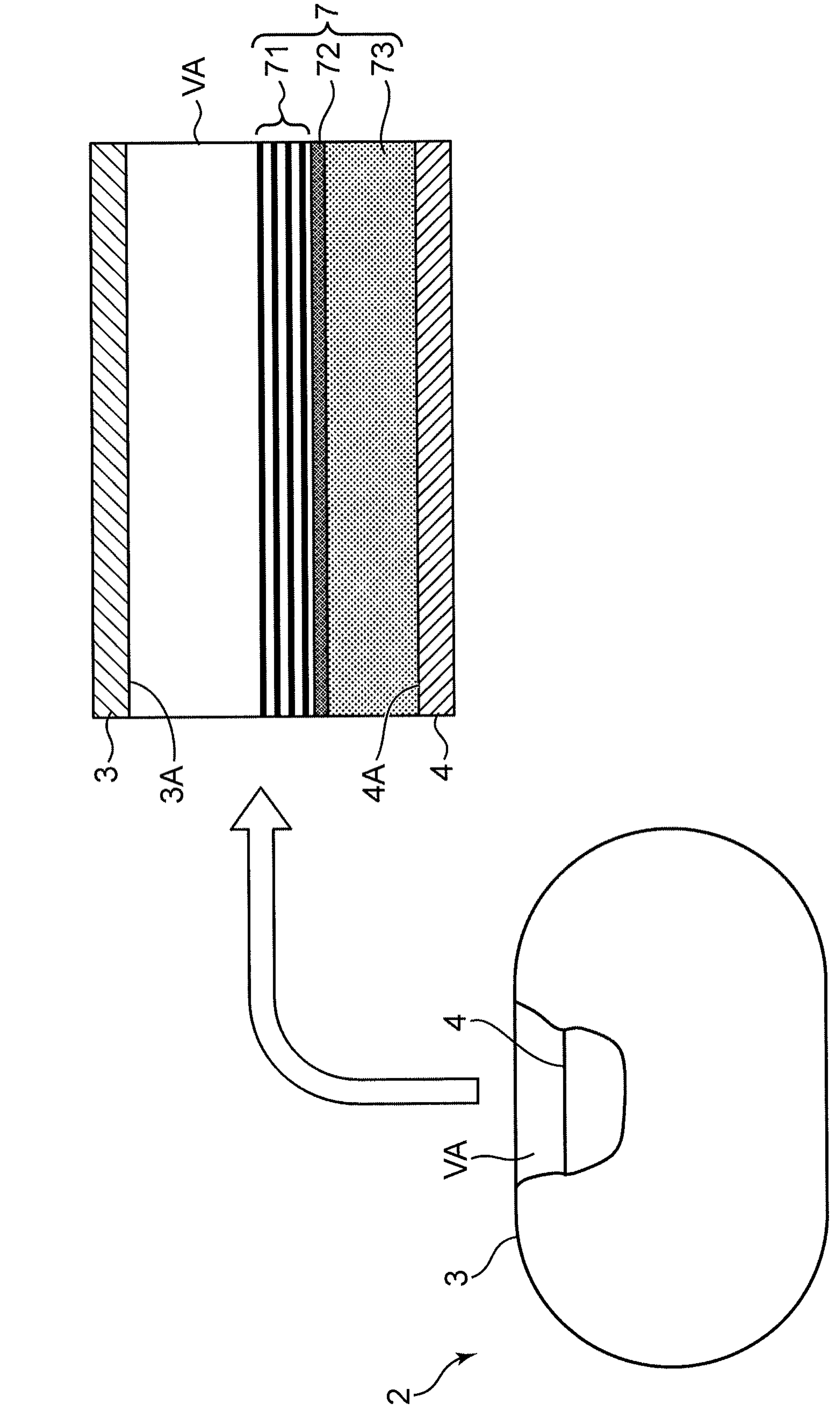
FIG. 12 is a schematic view illustrating a heat insulating structure between the inner tank and the outer tank.

FIG. 12 is a schematic view illustrating a heat insulating structure 7 disposed between the outer tank 3 and the inner tank 4. A vacuum layer VA is interposed between the inner surface 3A of the outer tank 3 and the outer surface 4A of the inner tank 4. Vacuum heat insulation provided by the vacuum layer VA suppresses heat conduction and convective heat transfer between the outer tank 3 and the inner tank 4. However, the vacuum layer VA alone cannot block radiant heat from the outer tank 3 to the inner tank 4. Further, it should be assumed that a situation occurs where the degree of vacuum of the vacuum layer VA is lowered for some reason. In view of these points, in the present embodiment, the heat insulating structure 7 is provided.

The heat insulating structure 7 includes a laminated heat insulating sheet layer 71, a vapor barrier layer 72, and a backup heat insulating layer 73. The laminated heat insulating sheet layer 71 is disposed so as to be separated from inner surface 3A of outer tank 3 by vacuum layer VA. The laminated heat insulating sheet layer 71 is formed by, for example, a multi-layer insulation (MLI) sheet. The MLI sheet formed by laminating a plastic film formed by depositing a metal such as aluminum and a spacer such as a glass fiber cloth in a multiple manner. The laminated heat insulating sheet layer 71 shields radiant heat from the outer tank 3 to the inner tank 4.

The vapor barrier layer 72 is disposed between the outer surface 4A of the inner tank 4 and the laminated heat insulating sheet layer 71. The backup heat insulating layer 73 is disposed between the vapor barrier layer 72 and the outer surface 4A of the inner tank 4. As the vapor barrier layer 72, for example, a laminate of a resin film and a metal sheet can be used. The backup heat insulating layer 73 is formed using, for example, a closed cell type foam material. The backup heat insulating layer 73 is provided so as to cover the outer surface 4A of the inner tank 4 including protrusions such as the stringer 45.

The laminated heat insulating sheet layer 71 functions exclusively as a heat insulating layer for radiant heat in a state where the degree of vacuum of the vacuum layer VA is maintained. However, for example, when air flows between the inner surface 3A of the outer tank 3 and the outer surface 4A of the inner tank 4 and impairs the vacuum layer VA, heat insulation performance is impaired. This is because the air serves as a heat carrier to transfer the heat retained in the outer tank 3 to the laminated heat insulating sheet layer 71. When such an event occurs, the backup heat insulating layer 73 exerts a heat insulating effect and protects the inner tank 4. The thickness of the backup heat insulating layer 73 is set to a thickness capable of suppressing generation of liquefied air on the outer surface 4A of the inner tank 4 and excessive boil-off of stored liquid hydrogen even when air flows into the vacuum layer VA.

The vapor barrier layer 72 suppresses penetration of outgas from the backup heat insulating layer 73 into the vacuum layer VA during normal operation. On the other hand, when the vacuum layer VA is damaged, the vapor barrier layer 72 suppresses inflow of air into the backup heat insulating layer 73. When any member is disposed in a vacuum environment, a gas adsorbed on the surface of the member, or a gas accumulated in the member flows out as an outgas. When the outgas enters the vacuum layer VA, the degree of vacuum of the vacuum layer VA decreases. The backup heat insulating layer 73 may allow outgas to flow out. The vapor barrier layer 72 blocks such outgas. Further, for example, when air that has entered between the inner surface 3A of the outer tank 3 and the outer surface 4A of the inner tank 4 comes into contact with the backup heat insulating layer 73, there is a possibility that the backup heat insulating layer 73 holds air therein. The vapor barrier layer 72 blocks contact between the backup heat insulating layer 73 and air.

By providing the heat insulating structure 7 as described above, the heat insulating property between the tanks can be secured by the vacuum layer VA and the laminated heat insulating sheet layer 71 during normal operation of the hydrogen storage tank 2. On the other hand, even if a situation occurs where the degree of vacuum of the vacuum layer VA drops for some reason, the backup heat insulating layer 73 is present, so that the heat insulating property can be maintained. Further, by interposing the vapor barrier layer 72, it is possible to prevent deterioration of the vacuum layer VA due to outgas and to protect the backup heat insulating layer 73.

[Divided Structure of Outer Tank]

In general, a fuel tank of an aircraft is assumed to be operated for a long period of time of several decades. On the other hand, the fuel tank of the aircraft is applied with an external load such as an inertia load and vibration due to airframe motions. The fuel tank of the aircraft is also subjected to an operation condition such as a temperature change and a pressure change due to a change in flight altitude. Therefore, it is necessary to appropriately perform maintenance including confirmation of soundness of the fuel tank, various inspections, repair, and the like. The same applies to the hydrogen aircraft 1 of the present embodiment, and it is desirable to perform maintenance of the hydrogen storage tank 2 at an appropriate timing. In order to improve the workability of maintenance, it is desirable that the outer tank 3 can be easily disassembled. If the outer tank 3 can be disassembled, not only the outer tank 3 itself but also the inner tank 4, the support structure SU, and the like can be easily inspected and repaired.

Figure 13:
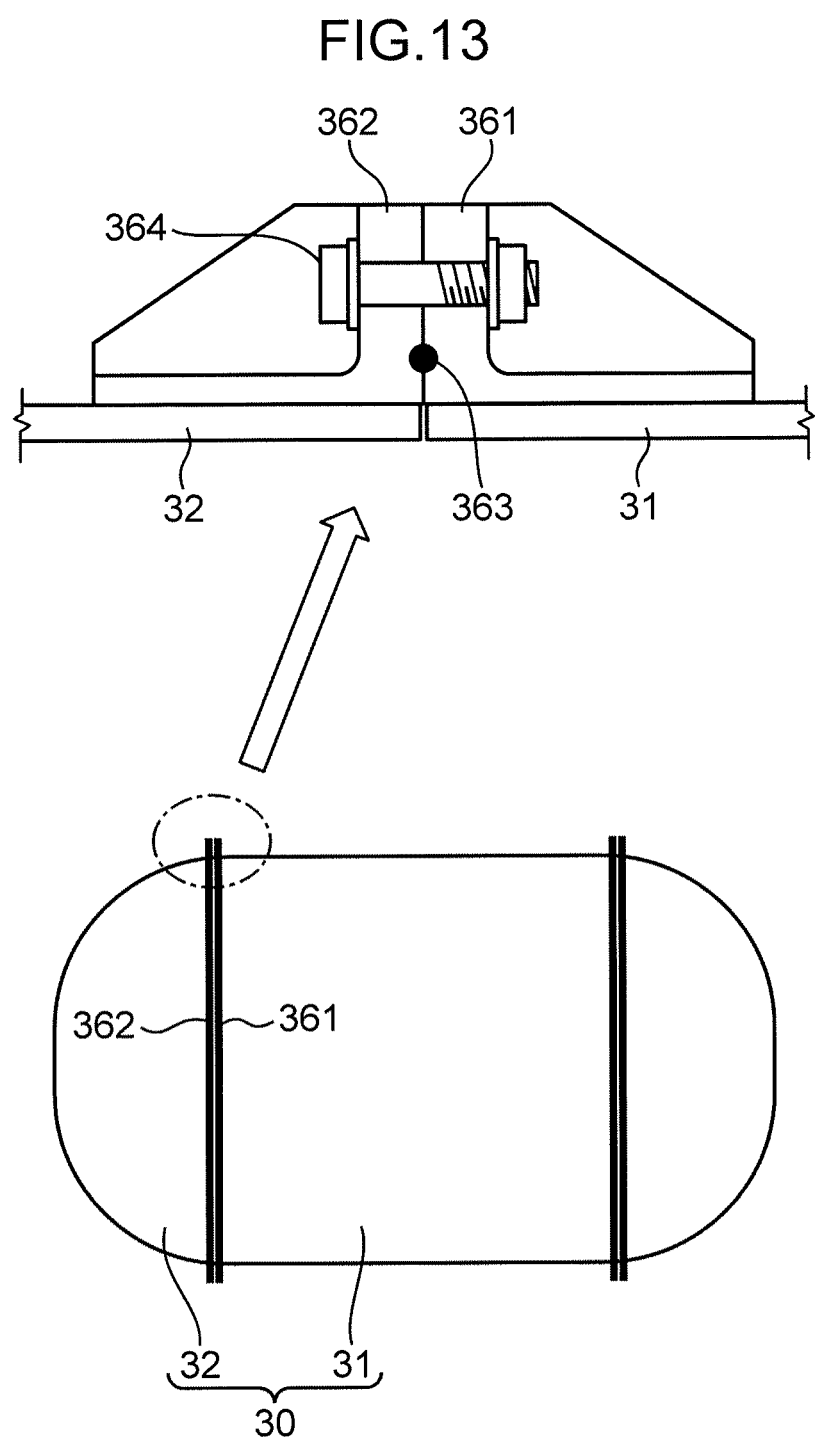

FIG. 13 is a schematic view illustrating a split type outer tank 30 which is a modification of the outer tank 3 described above. The outer tank cylinder 31 and the outer tank lid 32 can be connected by welding. However, if both are integrated by welding, it is difficult to disassemble outer tank 3. In the outer tank 30 of the split type illustrated in FIG. 13, the outer tank cylinder 31 and the outer tank lid 32 have a flange connection structure, and the outer tank lid 32 is attachable to and detachable from the outer tank cylinder 31.

A cylinder flange 361 having an abutting surface is attached to opening peripheral edges of one end and the other end of the cylindrical outer tank cylinder 31. A lid flange 362 having a similar abutting surface is attached to an opening peripheral edge of the dome-shaped outer tank lid 32. The cylinder flange 361 and the lid flange 362 are abutted with each other with an O-ring 363 interposed therebetween, and both the flanges 361 and 362 are fixed by fastening with a fastening bolt 364. The lid flange 362 can be removed from the cylinder flange 361 by removing the fastening bolt 364. By removing the lid flange 362 from the cylinder flange 361, the inner tank 4 and the support structure SU can be exposed. Thus, the worker can easily start maintenance work. Note that the flange connection structure may be provided only at one of one end and the other end of the outer tank cylinder 31.

SUMMARY OF PRESENT DISCLOSURE

The specific embodiments described above include a disclosure having the following configurations.

A hydrogen storage tank for a hydrogen aircraft according to a first aspect of the present disclosure is a hydrogen storage tank that stores hydrogen as fuel for a hydrogen aircraft, the hydrogen storage tank including an outer tank, an inner tank disposed inside the outer tank with a space therebetween and having a shape having a longitudinal direction, a first strap including a first end and a second end opposite to the first end, the first end being connected to an inner surface of the outer tank and the second end being connected to an outer surface of the inner tank, and a second strap including a third end and a fourth end opposite to the third end, the third end being connected to the inner surface of the outer tank and the fourth end being connected to the outer surface of the inner tank, in which the first strap and the second strap extend along the longitudinal direction of the inner tank, and a distance between the second end and the fourth end is shorter than a distance between the first end and the third end in the longitudinal direction.

According to a first aspect, a distance between the second end and the fourth end connected to the outer surface of the inner tank is shorter than a distance between the first end and the third end connected to the inner surface of the outer tank. Since the inner tank comes into contact with liquid hydrogen, thermal expansion and contraction larger than those of the outer tank occur. However, since the second end and the fourth end are disposed at a relatively short distance, it is possible to suppress the influence of the thermal expansion and contraction behaviors of the inner tank on the support structure of the inner tank including the first strap and the second strap. In other words, since the distance between the supporting points of the inner tank is short, it is possible to suppress the influence of the thermal expansion and contraction behaviors of the inner tank on the support structure of the inner tank including the first strap and the second strap. Further, the first strap and the second strap extend along the longitudinal direction of the inner tank. Thus, the first strap supports a load toward one side in the longitudinal direction of the inner tank and the second strap receives a load toward the other side as a tensile load. Therefore, it is possible to use a strap having a relatively small cross-sectional area. This also contributes to suppression of heat applied into the inner tank through the strap.

In a hydrogen storage tank for a hydrogen aircraft according to a second aspect, in the hydrogen storage tank of the first aspect, the second end and the fourth end are adjacent to each other.

According to the second aspect, the second end and the fourth end are arranged at a close distance. Thus, the influence of the thermal expansion and contraction behaviors of the inner tank can be further suppressed.

In a hydrogen storage tank for a hydrogen aircraft according to a third aspect, in the hydrogen storage tank of the first or second aspect, the first end, the second end, the third end, and the fourth end are arranged in one plane along the longitudinal direction.

According to the third aspect, as a result of respective ends of both straps being arranged in one plane, the first strap and the second strap are also arranged in one plane. Thus, a load applied to the inner tank is transferred only as an in-plane tensile load of the first strap and the second strap. Therefore, it is not necessary to consider buckling of the strap, and it is possible to use a strap having a smaller cross-sectional area and a longer length as the first strap and the second strap. As a result, it is possible to suppress heat input to the inner tank and reduce the weight of the inner tank support structure.

In a hydrogen storage tank for a hydrogen aircraft according to a fourth aspect, in the hydrogen storage tank of the first to third aspects, in which the first end and the third end are each pivotally connected to the inner surface of the outer tank, and the second end and the fourth end are each pivotally connected to the outer surface of the inner tank.

According to the fourth aspect, each end of each strap is pivotable. Thus, no bending load is applied to each strap. Therefore, the first strap and the second strap are prevented from being damaged by a bending load.

In a hydrogen storage tank for a hydrogen aircraft according to a fifth aspect, in the hydrogen storage tank of the first to fourth aspects, the inner tank includes a stringer extending in the longitudinal direction on the outer surface of the inner tank, and the second end and the fourth end are each connected to the stringer.

According to the fifth aspect, since the second end and the fourth end are connected to the stringer that reinforces the rigidity of the inner tank, the stringer can support a load generated during operation of the aircraft or the like. In particular, since the stringer and the strap extend in the same direction, it is easy to transfer a load to the stringer. Therefore, the inner tank can be more stably supported. Further, since the load is intensively supported by the stringer, the wall thickness of the inner tank 4 can be reduced in thickness and weight.

In a hydrogen storage tank for a hydrogen aircraft according to a sixth aspect, in the hydrogen storage tank of any one of the first to fifth aspects, the outer tank includes a loop-shaped frame that is connected to the inner surface of the outer tank and protrudes to an inside of the outer tank at positions corresponding to one end side and another end side in the longitudinal direction of the inner tank, and the first end and the third end are respectively connected to frames on the one end side and the other end side.

According to the sixth aspect, the first end and the third end are connected to a loop-shaped frame protruding inward of the outer tank. Thus, the load can be supported by the frame, and the inner tank can be more stably supported.

In a hydrogen storage tank for a hydrogen aircraft according to a seventh aspect, in the hydrogen aircraft of any one of the first to seventh aspects, the inner tank has a tubular side peripheral surface along the longitudinal direction, and the hydrogen storage tank further comprises a rod extending in a circumferential direction of the side peripheral surface and connecting the side peripheral surface and the inner surface of the outer tank.

According to the seventh aspect, loads in the horizontal direction and the up-down direction applied to the inner tank can be transferred by the rod. Therefore, the first strap and the second strap can cooperate with the rod to more stably support the inner tank.

In a hydrogen storage tank for a hydrogen aircraft according to an eighth aspect, in the hydrogen storage tank of the seventh aspect, the side peripheral surface is a cylindrical surface, and the rod extends in a tangential direction of the cylindrical surface.

According to the eighth aspect, by arranging the rod in the tangential direction, a load applied to the wall surface of the inner tank through the rod is easily supported as a load in an in-plane direction.

In a hydrogen storage tank for a hydrogen aircraft according to a ninth aspect, in the hydrogen storage tank of the seventh or eighth aspect, one end of the rod is pivotally connected to the side peripheral surface of the inner tank, and another end of the rod is pivotally connected to the inner surface of the outer tank.

According to the ninth aspect, one end and the other end of the rod are pivotally connected to the inner tank and the outer tank, respectively. Thus, the rod does not support a bending load and transfers only a tensile load or a compressive load. Therefore, the rod is prevented from being damaged by the bending load.

A hydrogen storage tank for a hydrogen aircraft according to a tenth aspect, in the hydrogen storage tank of any one of the first to ninth aspects, further includes a heat insulating structure disposed between the outer tank and the inner tank, in which the heat insulating structure includes a laminated heat insulating sheet layer disposed to be separated from the inner surface of the outer tank by a vacuum layer, a vapor barrier layer disposed between the outer surface of the inner tank and the laminated heat insulating sheet layer, and a backup heat insulating layer arranged between the vapor barrier layer and the outer surface of the inner tank.

According to the tenth aspect, during normal operation, the heat insulating property between the tanks can be secured by the vacuum layer between the inner tank and the outer tank. On the other hand, even if a situation occurs where the degree of vacuum of the vacuum layer drops for some reason, the backup heat insulating layer is present, so that the heat insulating property can be maintained. Further, the backup heat insulating layer is covered with a vapor barrier layer and is not in direct contact with the vacuum layer. Therefore, it is possible to suppress penetration of outgas from the backup heat insulating layer into the vacuum layer and inflow of air from the vacuum layer into the backup heat insulating layer at the time of vacuum breakage.

In a hydrogen storage tank for a hydrogen aircraft according to an eleventh aspect, in the hydrogen storage tank of any one of the first to tenth aspects, the outer tank includes a cylinder having one end and another end opened, and dome-shaped lids that close the one end and the other end of the cylinder, and the lid of at least one of the one end or the other end of the cylinder is detachable from the cylinder.

According to the eleventh aspect, since the lid is detachable from the cylinder, the outer tank can be disassembled. Therefore, the worker can easily perform work such as confirmation of soundness of the outer tank, inspection, or repair.

The invention claimed is:

1. A hydrogen storage tank that stores hydrogen as fuel for a hydrogen aircraft, the hydrogen storage tank comprising:
- an outer tank;
- an inner tank disposed inside the outer tank with a space therebetween and having a shape having a longitudinal direction;
- a first strap including a first end and a second end opposite to the first end, the first end being connected to an inner surface of the outer tank and the second end being connected to an outer surface of the inner tank; and
- a second strap including a third end and a fourth end opposite to the third end, the third end being connected to the inner surface of the outer tank and the fourth end being connected to the outer surface of the inner tank, wherein;
- the first strap and the second strap extend along the longitudinal direction of the inner tank,
- a distance between the second end and the fourth end is shorter than a distance between the first end and the third end in the longitudinal direction,
- the outer tank includes loop-shaped frames that are connected to the inner surface of the outer tank and protrude to an inside of the outer tank at positions corresponding to one end side and another end side in the longitudinal direction of the inner tank, and
- the first end and the third end are respectively connected to the looped-shaped frames on the one end side and the other end side.

2. The hydrogen storage tank for a hydrogen aircraft according to claim 1, wherein;
- the second end and the fourth end are adjacent to each other.

3. The hydrogen storage tank for a hydrogen aircraft according to claim 1, wherein:
- the first end, the second end, the third end, and the fourth end are arranged in one plane along the longitudinal direction.

4. The hydrogen storage tank for a hydrogen aircraft according to claim 1, wherein:
- the first end and the third end are each pivotally connected to the inner surface of the outer tank, and
- the second end and the fourth end are each pivotally connected to the outer surface of the inner tank.

5. The hydrogen storage tank for a hydrogen aircraft according to claim 1, wherein;
- the inner tank includes a stringer extending in the longitudinal direction on the outer surface of the inner tank, and
- the second end and the fourth end are each connected to the stringer.

6. The hydrogen storage tank for a hydrogen aircraft according to claim 1, wherein:
- the outer tank includes a cylinder having one end and another end opened, and dome-shaped lids that close the one end and the other end of the cylinder, and
- the lid of at least one of the one end or the other end of the cylinder is detachable from the cylinder.

7. The hydrogen storage tank for a hydrogen aircraft according to claim 1, wherein:
- the outer tank includes an external reinforcing frame connected to an outer surface of the outer tank and protruding radially outward.

8. The hydrogen storage tank for a hydrogen aircraft according to claim 1, wherein:
- the inner tank includes an inner tank cylinder and a pair of inner tank lids closing openings at a front end and a rear end of the inner tank cylinder.

9. The hydrogen storage tank for a hydrogen aircraft according to claim 8, wherein:
- the inner tank cylinder includes a center frame extending in a circumferential direction.

10. The hydrogen storage tank for a hydrogen aircraft according to claim 9, wherein:
- the first strap is disposed on a front side of the center frame and the second strap is disposed on a rear side of the center frame.

11. The hydrogen storage tank for a hydrogen aircraft according to claim 1, wherein:
- the first strap includes a main body portion made of a thin strip.

12. A hydrogen storage tank that stores hydrogen as fuel for a hydrogen aircraft, the hydrogen storage tank comprising:
- an outer tank;
- an inner tank disposed inside the outer tank with a space therebetween and having a shape having a longitudinal direction;
- a first strap including a first end and a second end opposite to the first end, the first end being connected to an inner surface of the outer tank and the second end being connected to an outer surface of the inner tank; and
- a second strap including a third end and a fourth end opposite to the third end, the third end being connected to the inner surface of the outer tank and the fourth end being connected to the outer surface of the inner tank, wherein:
- the first strap and the second strap extend along the longitudinal direction of the inner tank,
- a distance between the second end and the fourth end is shorter than a distance between the first end and the third end in the longitudinal direction,
- the inner tank has a tubular side peripheral surface along the longitudinal direction, and
- the hydrogen storage tank further comprises a rod extending in a circumferential direction of the side peripheral surface and connecting the side peripheral surface and the inner surface of the outer tank.

13. The hydrogen storage tank for a hydrogen aircraft according to claim 12, wherein:
- the side peripheral surface is a cylindrical surface, and
- the rod extends in a tangential direction of the cylindrical surface.

14. The hydrogen storage tank for a hydrogen aircraft according to claim 12, wherein;
- one end of the rod is pivotally connected to the side peripheral surface of the inner tank, and another end of the rod is pivotally connected to the inner surface of the outer tank.

15. The hydrogen storage tank for a hydrogen aircraft according to claim 12, wherein:
- the rod connects the side peripheral surface and the inner surface of the outer tank in a vacuum layer.

16. The hydrogen storage tank for a hydrogen aircraft according to claim 12, wherein:

the rod comprises four rods arranged on upper, lower, left, and right sides of the inner tank at intervals of 90 degrees in a circumferential direction.

17. The hydrogen storage tank for a hydrogen aircraft according to claim 16, wherein:

the four rods include a pair of vertical rods arranged on left and right sides of the inner tank to transfer an up-down direction load.

18. A hydrogen storage tank that stores hydrogen as fuel for a hydrogen aircraft, the hydrogen storage tank comprising:

an outer tank;

an inner tank disposed inside the outer tank with a space therebetween and having a shape having a longitudinal direction:

a first strap including a first end and a second end opposite to the first end, the first end being connected to an inner surface of the outer tank and the second end being connected to an outer surface of the inner tank; and a second strap including a third end and a fourth end opposite to the third end, the third end being connected to the inner surface of the outer tank and the fourth end being connected to the outer surface of the inner tank, wherein:

the first strap and the second strap extend along the longitudinal direction of the inner tank, a distance between the second end and the fourth end is shorter than a distance between the first end and the third end in the longitudinal direction, the hydrogen storage tank further comprising a heat insulating structure disposed between the outer tank and the inner tank, wherein the heat insulating structure includes:

a laminated heat insulating sheet layer disposed to be separated from the inner surface of the outer tank by a vacuum layer;

a vapor barrier layer disposed between the outer surface of the inner tank and the laminated heat insulating sheet layer; and a backup heat insulating layer arranged between the vapor barrier layer and the outer surface of the inner tank.

19. The hydrogen storage tank for a hydrogen aircraft according to claim 18, wherein:

the vapor barrier layer comprises a laminate of a resin film and a metal sheet.

20. The hydrogen storage tank for a hydrogen aircraft according to claim 18, wherein:

the backup heat insulating layer covers the outer surface of the inner tank and comprises a closed cell foam material.

* * * * *